US010465529B2

(12) United States Patent
Clum et al.

(10) Patent No.: US 10,465,529 B2
(45) Date of Patent: Nov. 5, 2019

(54) LEADING EDGE HYBRID CAVITIES AND CORES FOR AIRFOILS OF GAS TURBINE ENGINE

(71) Applicant: United Technologies Corporation, Farmington, CT (US)

(72) Inventors: Carey Clum, East Hartford, CT (US); Dominic J. Mongillo, Jr., West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 510 days.

(21) Appl. No.: 15/368,737

(22) Filed: Dec. 5, 2016

(65) Prior Publication Data

US 2018/0156043 A1 Jun. 7, 2018

(51) Int. Cl.
*B22C 9/10* (2006.01)
*B22C 9/04* (2006.01)
*F01D 5/18* (2006.01)
*F01D 9/02* (2006.01)
*F01D 25/12* (2006.01)

(52) U.S. Cl.
CPC ............... *F01D 5/188* (2013.01); *B22C 9/04* (2013.01); *B22C 9/10* (2013.01); *B22C 9/103* (2013.01); *F01D 5/187* (2013.01); *F01D 9/02* (2013.01); *F01D 25/12* (2013.01); *F05D 2220/32* (2013.01); *F05D 2230/211* (2013.01); *F05D 2240/304* (2013.01); *F05D 2240/307* (2013.01); *F05D 2260/2212* (2013.01); *F05D 2260/22141* (2013.01); *Y02T 50/673* (2013.01); *Y02T 50/676* (2013.01)

(58) Field of Classification Search
CPC .............. B22C 9/04; B22C 9/10; B22C 9/103

USPC ........................................................ 164/369
See application file for complete search history.

(56) References Cited

U.S. PATENT DOCUMENTS

| 7,413,403 | B2 | 8/2008 | Cunha et al. |
| 7,568,887 | B1 | 8/2009 | Liang |
| 7,780,414 | B1 | 8/2010 | Liang |
| 7,857,589 | B1 | 12/2010 | Liang |
| 8,454,301 | B1 | 6/2013 | Liang |
| 9,228,442 | B2 | 1/2016 | Mongillo, Jr. et al. |

(Continued)

FOREIGN PATENT DOCUMENTS

| EP | 1059419 A1 | 12/2000 |
| EP | 1927727 A2 | 6/2008 |

(Continued)

OTHER PUBLICATIONS

European Search Report, European Application No. 17205442.1, dated Mar. 12, 2018, European Patent Office; European Search Report 9 pages.

*Primary Examiner* — Kevin P Kerns
(74) *Attorney, Agent, or Firm* — Cantor Colburn LLP

(57) ABSTRACT

Core assemblies for manufacturing airfoils and airfoils made therefrom, the core assemblies having a leading edge hybrid skin core positioned relative to a plurality of core bodies and configured to define a leading edge cavity at a leading edge of the manufactured airfoil. The leading edge hybrid skin core extends from a root region toward a tip region in a radial direction, the leading edge hybrid skin core extends above at least one of the plurality of core bodies to define an exit in a tip region of the manufactured airfoil, and the leading edge hybrid skin core has a height-to-width ratio of about 0.8 or less.

9 Claims, 9 Drawing Sheets

(56) References Cited

U.S. PATENT DOCUMENTS

| | | |
|---|---|---|
| 10,233,761 B2 | 3/2019 | Snider et al. |
| 10,273,810 B2 | 4/2019 | Weber et al. |
| 2005/0008487 A1 | 1/2005 | Lee et al. |
| 2008/0080979 A1 | 4/2008 | Brassfield et al. |
| 2010/0303625 A1 | 12/2010 | Kuhne et al. |
| 2011/0176929 A1 | 7/2011 | Ammann et al. |
| 2014/0199177 A1 | 7/2014 | Propheter-Hinckley et al. |
| 2015/0118063 A1 | 4/2015 | Lewis et al. |
| 2016/0326884 A1 | 11/2016 | Lewis |
| 2017/0183969 A1 | 6/2017 | Dujol et al. |
| 2018/0156042 A1 | 6/2018 | Mongillo, Jr. et al. |
| 2018/0156045 A1 | 6/2018 | Clum et al. |
| 2018/0156049 A1 | 6/2018 | Clum et al. |

FOREIGN PATENT DOCUMENTS

| | | |
|---|---|---|
| EP | 2161412 A2 | 3/2010 |
| EP | 2942488 A1 | 11/2015 |
| EP | 3091186 A1 | 11/2016 |
| WO | 2014035848 A1 | 3/2014 |
| WO | 2014052277 A1 | 4/2014 |
| WO | 2014105108 A1 | 7/2014 |
| WO | 2014130244 A1 | 8/2014 |
| WO | 2015009448 A1 | 1/2015 |
| WO | 2015034815 A1 | 3/2015 |
| WO | 2015061117 A1 | 4/2015 |
| WO | 2015094498 A1 | 6/2015 |
| WO | 2015181497 A1 | 12/2015 |
| WO | 2016060654 A1 | 4/2016 |

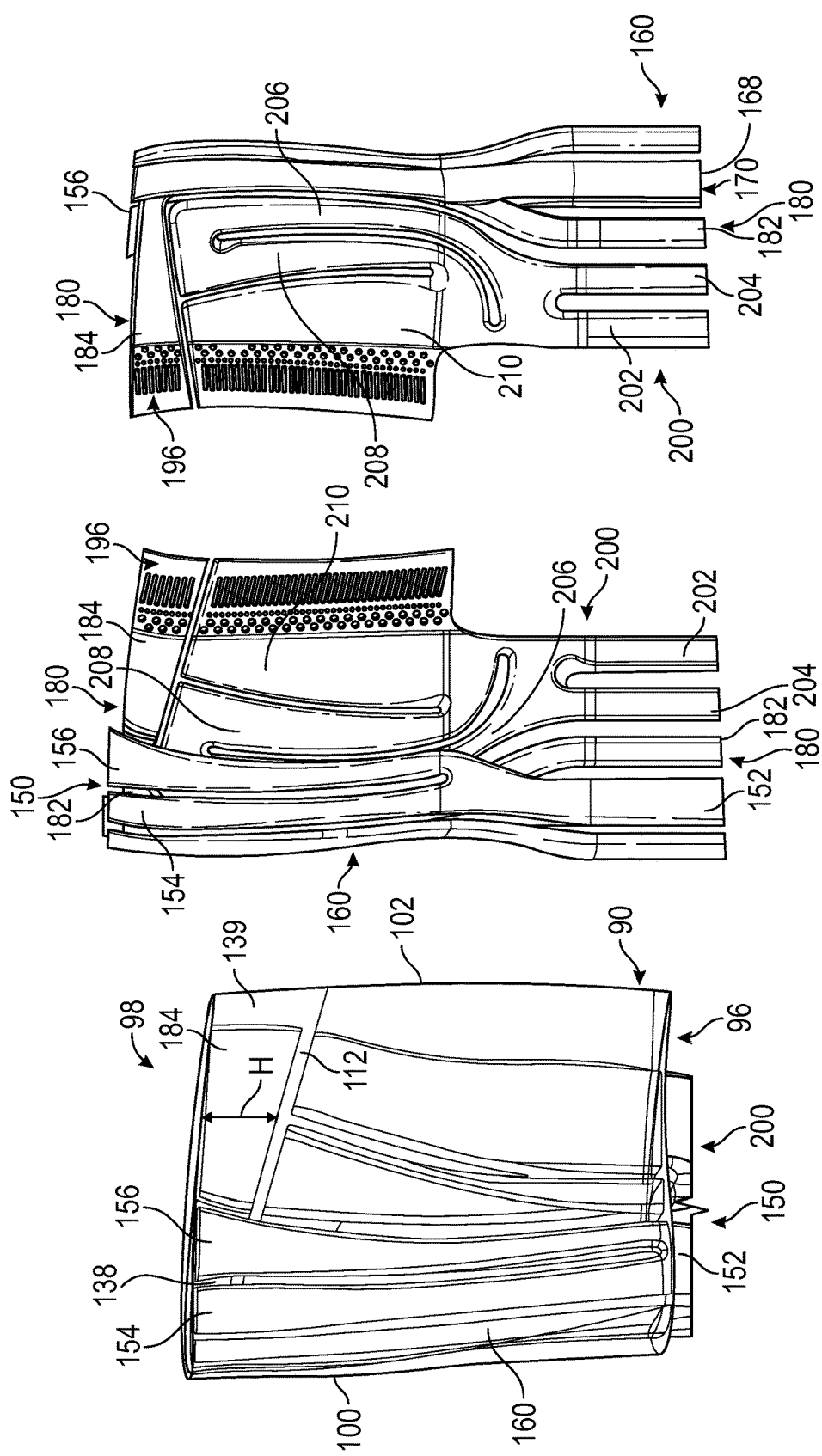

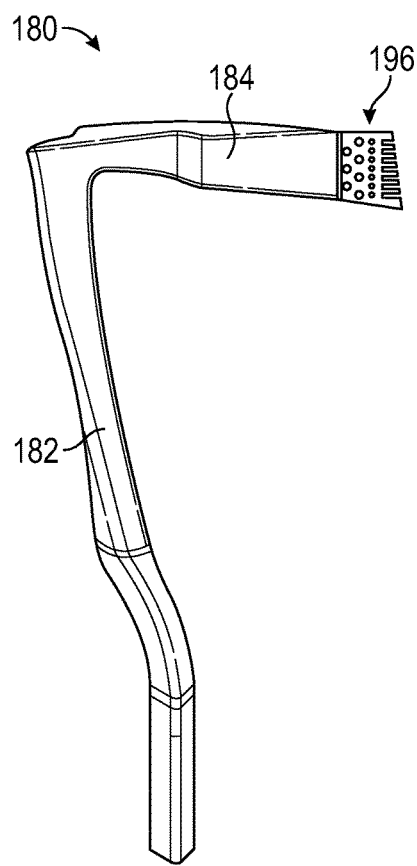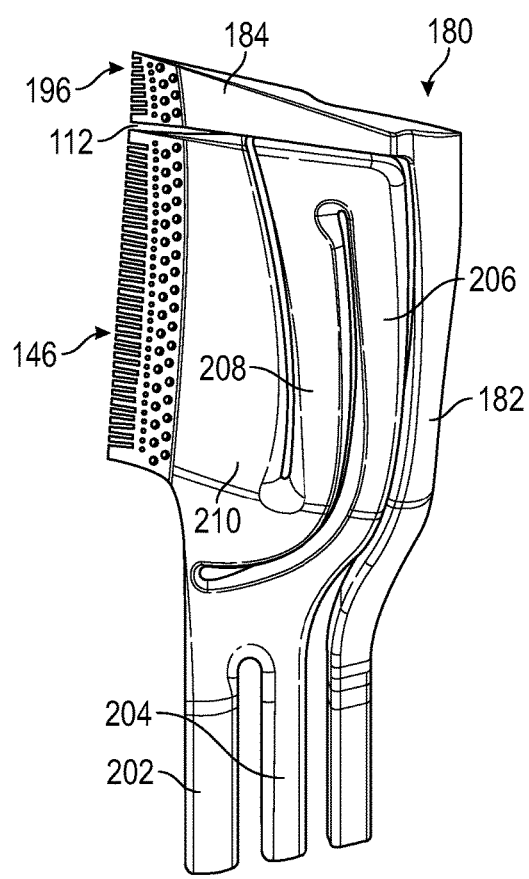
FIG. 15
FIG. 16

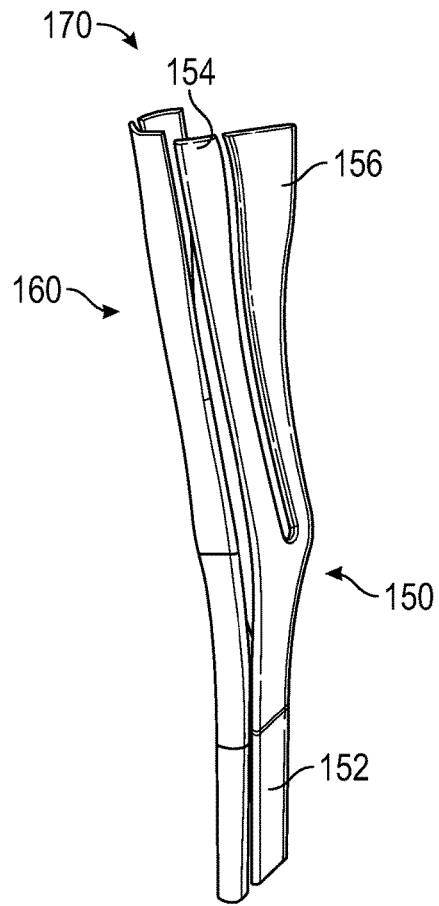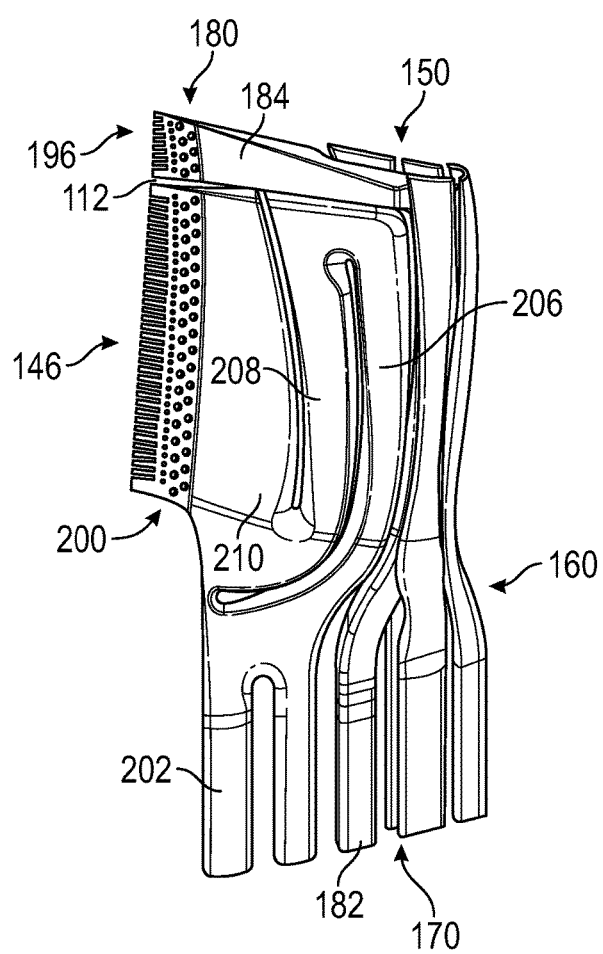
FIG. 17
FIG. 18

LEADING EDGE HYBRID CAVITIES AND CORES FOR AIRFOILS OF GAS TURBINE ENGINE

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Flow across the airfoil tip may affect gas turbine engine performance. Clearance, abrasion and temperature effects are of concern proximate the tip region of the airfoil.

BRIEF DESCRIPTION

According to some embodiments, core assemblies for manufacturing airfoils of gas turbine engines are provided. The core assemblies include a leading edge hybrid skin core positioned relative to a plurality of core bodies and configured to define a leading edge cavity at a leading edge of the manufactured airfoil. The leading edge hybrid skin core extends from a root region toward a tip region in a radial direction, the leading edge hybrid skin core extends above at least one of the plurality of core bodies to define an exit in a tip region of the manufactured airfoil, and the leading edge hybrid skin core has a height-to-width ratio of about 0.8 or less.

In addition to one or more of the features described herein, or as an alternative, further embodiments of the core assembly may include that the leading edge hybrid skin core has an arcuate geometry defined to match a contour of a leading edge of the manufactured airfoil.

In addition to one or more of the features described herein, or as an alternative, further embodiments of the core assembly may include that the plurality of core bodies includes a radial flow core located axially behind the leading edge hybrid skin core.

In addition to one or more of the features described herein, or as an alternative, further embodiments of the core assembly may include one or more structures extending between the radial flow core and the leading edge hybrid skin core to form resupply openings fluidly connecting cavities formed by the leading edge hybrid skin core and the radial flow core in the manufactured airfoil.

In addition to one or more of the features described herein, or as an alternative, further embodiments of the core assembly may include one or more structures extending between the leading edge hybrid skin core and at least one of the plurality of core bodies to form a fluid connection between cavities formed within in the manufacture airfoil.

In addition to one or more of the features described herein, or as an alternative, further embodiments of the core assembly may include that the leading edge hybrid skin core includes structures to form internal convective heat transfer augmentation features within a cavity formed thereby.

In addition to one or more of the features described herein, or as an alternative, further embodiments of the core assembly may include that the internal convective heat transfer augmentation features include at least one of trip strips, turbulators, pin fins, or pedestals.

In addition to one or more of the features described herein, or as an alternative, further embodiments of the core assembly may include that the plurality of core bodies have a pressure side hybrid skin core having a first trunk and a first branch that extends from the first trunk, a suction side hybrid skin core spaced apart from the pressure side hybrid skin core, wherein the leading edge hybrid skin core is circumferentially located between the pressure side and the suction side, and a radial flow core located between the pressure side hybrid skin core, the suction side hybrid skin core, and the leading edge.

In addition to one or more of the features described herein, or as an alternative, further embodiments of the core assembly may include that the radial flow core includes a radial core that is disposed generally parallel to at least one of the pressure side hybrid skin core, the suction side hybrid skin core, and the leading edge hybrid skin core.

In addition to one or more of the features described herein, or as an alternative, further embodiments of the core assembly may include that the radial flow core includes a radial diffusing tip flag core that extends from the radial core in a direction away from the leading edge hybrid skin core.

In addition to one or more of the features described herein, or as an alternative, further embodiments of the core assembly may include that the radial diffusing tip flag core has an increasing radial height dimension as the radial diffusing tip flag core extends away from the radial flow core.

According to some embodiments, airfoils for gas turbine engines are provided. The airfoils include an airfoil body having a leading edge, a trailing edge, a root region, and a tip region, wherein a direction from the root region to the tip region is a radial direction and a direction from the leading edge to the trailing edge is an axial direction, a leading edge hybrid skin core cavity formed within the airfoil body and defining a cooling flow path extending from a root region to a tip region of the airfoil proximate the leading edge of the airfoil, a plurality of cooling cavities formed within the airfoil body formed between the leading edge hybrid skin core cavity and the trailing edge of the airfoil body, and the leading edge hybrid skin core has a height-to-width ratio of about 0.8 or less.

In addition to one or more of the features described herein, or as an alternative, further embodiments of the airfoil may include that the leading edge hybrid skin core cavity has an arcuate geometry that matches a contour of the leading edge of the airfoil body that extends from the root region to the tip region defines a constant wall thickness at the leading edge of the airfoil.

In addition to one or more of the features described herein, or as an alternative, further embodiments of the airfoil may include that the plurality of cooling cavities includes a forward radial flow cavity located axially behind the leading edge hybrid skin core cavity.

In addition to one or more of the features described herein, or as an alternative, further embodiments of the airfoil may include one or more resupply openings fluidly connecting the leading edge hybrid skin core cavity and the forward radial flow cavity.

In addition to one or more of the features described herein, or as an alternative, further embodiments of the airfoil may include one or more fluid connections between the leading edge hybrid skin core cavity and at least one of the plurality of cooling cavities to form a fluid connection therebetween.

In addition to one or more of the features described herein, or as an alternative, further embodiments of the airfoil may include that the leading edge hybrid skin core cavity includes one or more internal convective heat transfer augmentation features.

In addition to one or more of the features described herein, or as an alternative, further embodiments of the airfoil may include that the internal convective heat transfer augmentation features include at least one of trip strips, turbulators, pin fins, or pedestals.

In addition to one or more of the features described herein, or as an alternative, further embodiments of the airfoil may include that the plurality of cooling cavities have a pressure side hybrid skin core cavity located within the airfoil body on a pressure side relative to the leading edge hybrid skin core cavity, a suction side hybrid skin core cavity spaced apart from the pressure side hybrid skin core cavity and located within the airfoil body on a suction side relative to the leading edge hybrid skin core cavity, wherein the leading edge hybrid skin core cavity is circumferentially located between the pressure side hybrid skin core cavity and the suction side hybrid skin core cavity, and a forward radial flow cavity located axially behind the leading edge hybrid skin core and between the pressure side hybrid skin core cavity and the suction side hybrid skin core cavity.

In addition to one or more of the features described herein, or as an alternative, further embodiments of the airfoil may include that the radial flow core cavity defines a flow cavity that is generally parallel to at least one of the pressure side hybrid skin core cavity, the suction side hybrid skin core cavity, and the leading edge hybrid skin core cavity.

In addition to one or more of the features described herein, or as an alternative, further embodiments of the airfoil may include that the radial flow core cavity includes a radial diffusing tip flag that extends from the radial flow core cavity in a direction axially away from the leading edge hybrid skin core cavity.

In addition to one or more of the features described herein, or as an alternative, further embodiments of the airfoil may include that the radial diffusing tip flag has an increasing radial height dimension as the radial diffusing tip flag extends away from the radial flow core cavity.

BRIEF DESCRIPTION OF THE DRAWINGS

The following descriptions should not be considered limiting in any way. With reference to the accompanying drawings, like elements are numbered alike:

FIG. 7 is a side view of a portion of an airfoil core assembly for forming a portion of the airfoil;

FIG. 8 is a first side view of an airfoil core assembly;

FIG. 9 is a second side view of the airfoil core assembly;

FIG. 15 is a perspective view of a second arrangement of a radial flow core;

FIG. 16 is a side perspective view of the second arrangement of the radial flow core and a serpentine flow core;

FIG. 17 is a perspective view of the suction side hybrid skin core, the pressure side hybrid skin core, and a leading edge hybrid skin core, in a shielding arrangement; and FIG. 18 is a side perspective view of the shielding arrangement disposed about a radial flow core and the serpentine flow core of the second arrangement.

DETAILED DESCRIPTION

A detailed description of one or more embodiments of the disclosed apparatus and method are presented herein by way of exemplification and not limitation with reference to the Figures.

Figure 1:
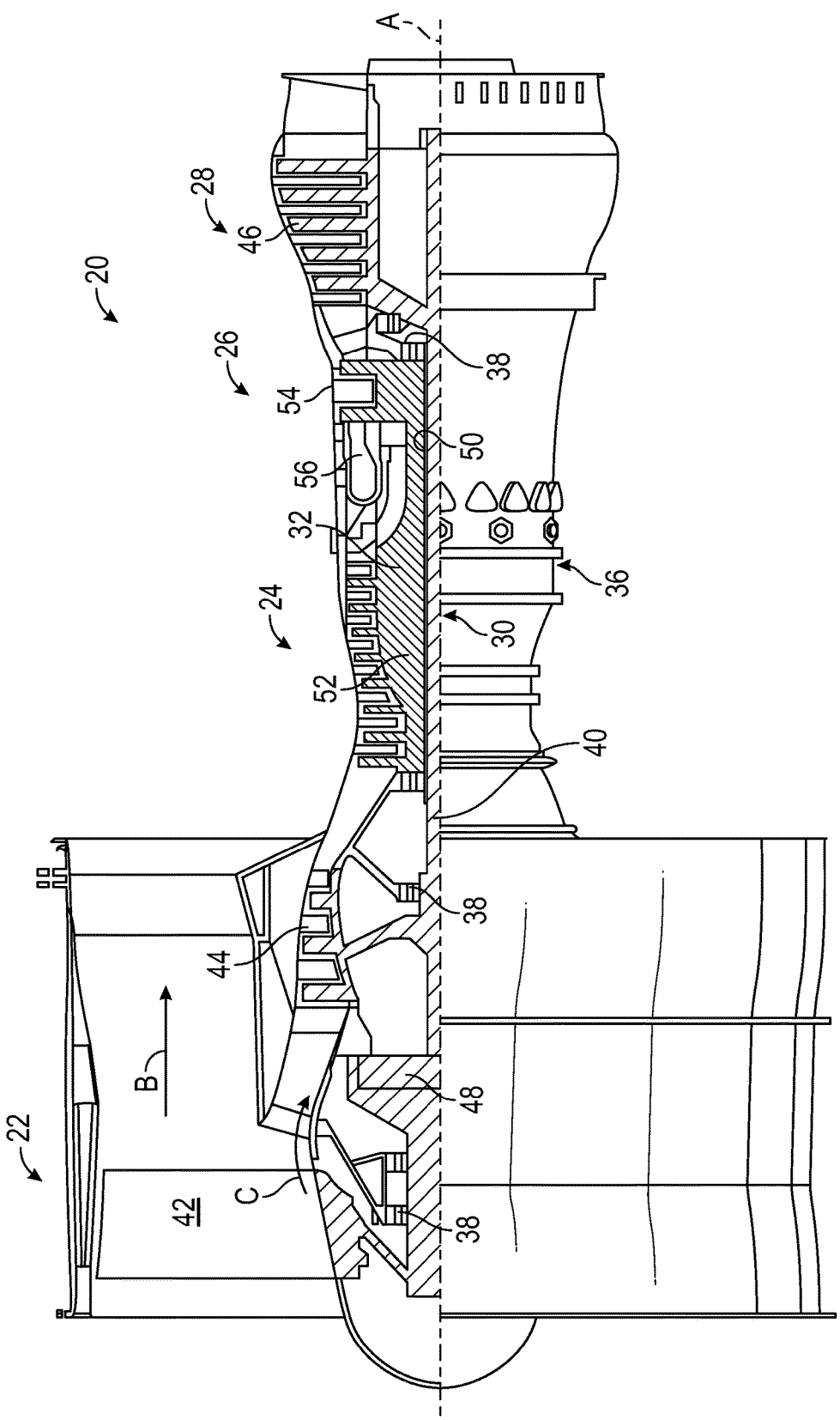
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54.

A combustor 56 of the combustor section 26 is arranged in the gas turbine engine 20. The combustor 56 is arranged between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28.

The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only illustrative of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ram}° R)/(518.7° R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
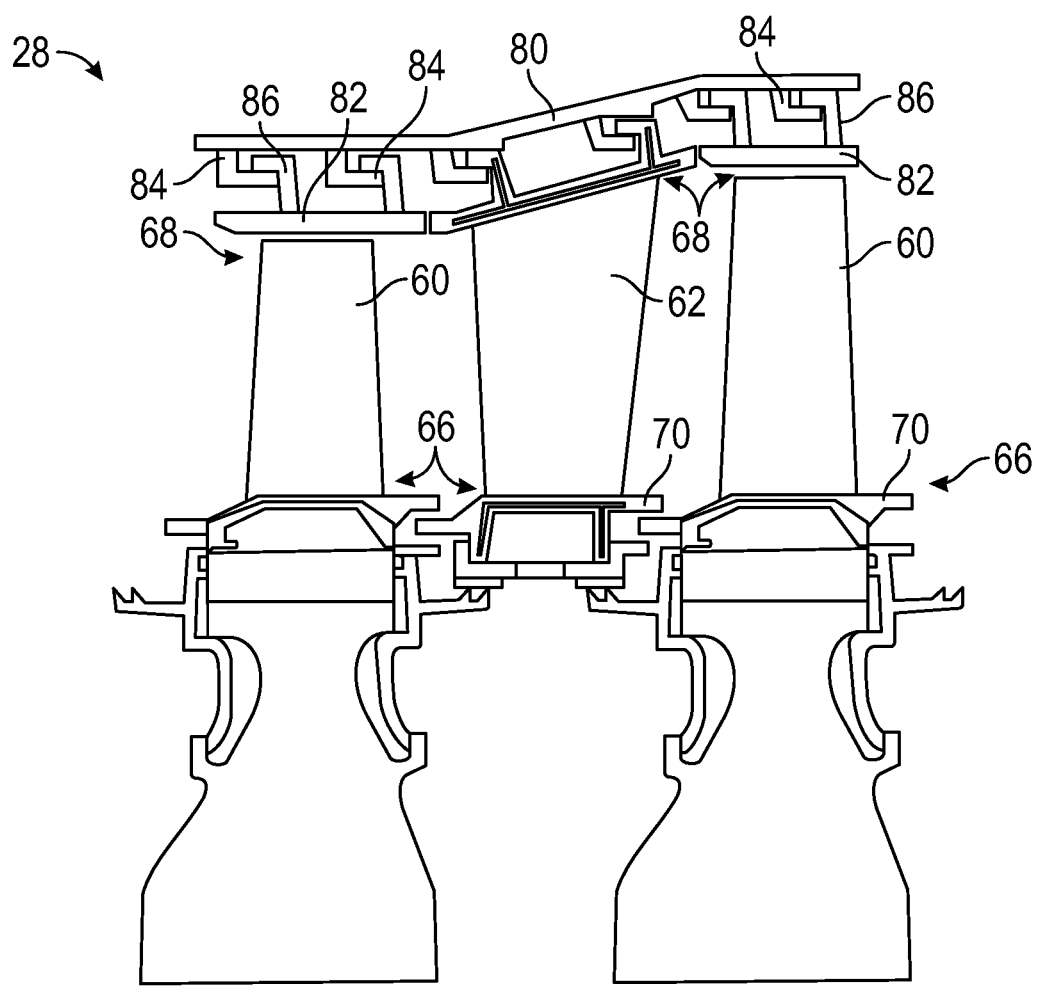
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connected to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
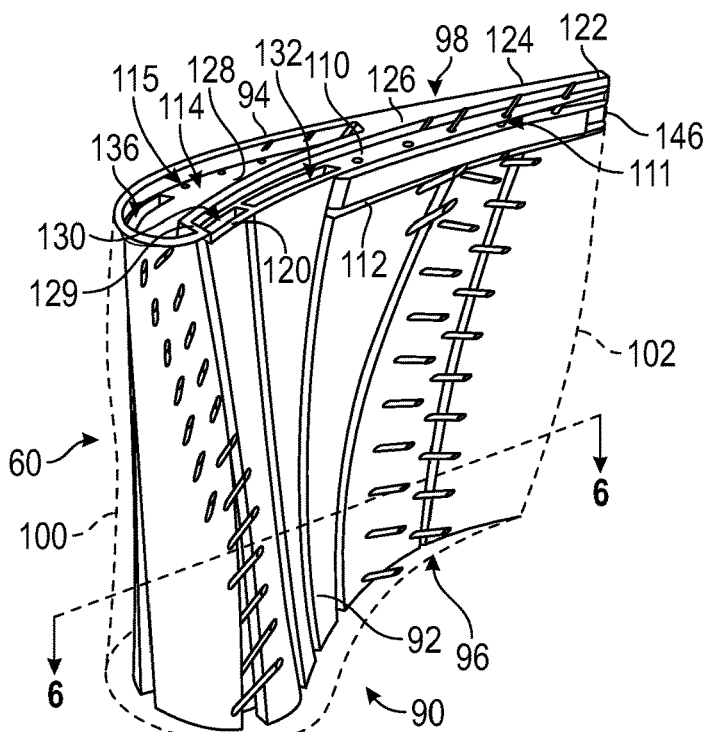
FIG. 3 is a perspective view of an airfoil.
Figure 4:
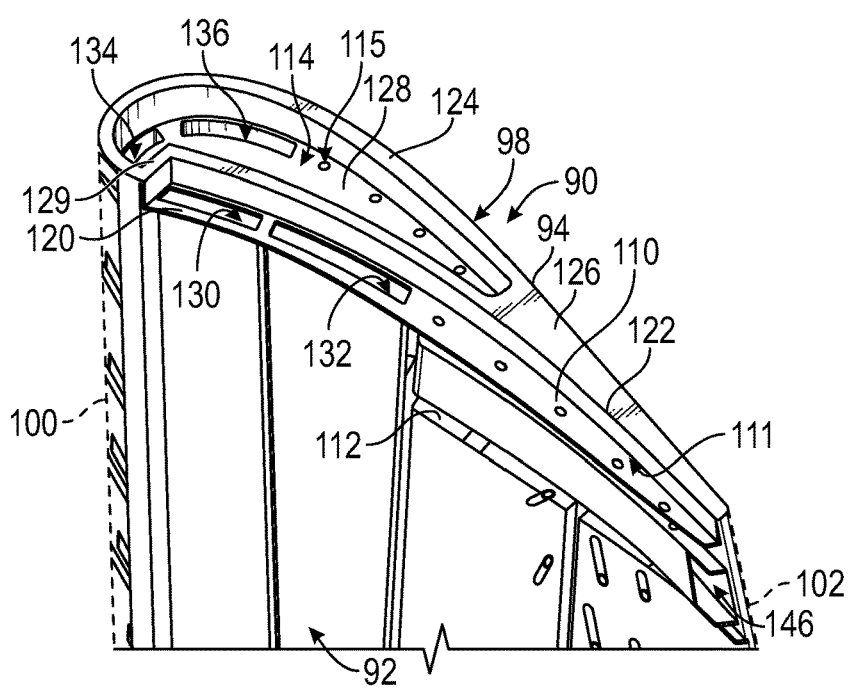
FIG. 4 is a partial perspective view of the airfoil.

As shown in FIGS. 3 and 4, the airfoil 60 includes an airfoil body 90 having a pressure side 92, a suction side 94, a root region 96, a tip region 98, a leading edge 100, and a trailing edge 102. The pressure side 92 is disposed opposite the suction side 94. The pressure side 92 and the suction side 94 each extend radially from the root region 96 toward the tip region 98. As used herein, the term "radial" refers to radial with respect to an engine axis (e.g., engine central longitudinal axis A shown in FIG. 1). The pressure side 92 and the suction side 94 each extend generally axially and/or tangentially (e.g., with respect to an engine axis) between the leading edge 100 and the trailing edge 102. Each of the root region 96 and the tip region 98 extend from the leading edge 100 to the trailing edge 102 opposite each other at ends of the airfoil body 90 in the radial direction. That is, the root region 96 defines an inner radial end of the airfoil body 90 and the tip region defines an outer radial end of the airfoil body 90 (relative to an engine axis).

The airfoil body 90 defines a tip shelf 110, a rib 112, and a tip squealer pocket 114 formed within the tip region 98 of the airfoil body 90.

The tip shelf 110 is radially recessed within the tip region 98 of the airfoil body 90 such that the tip shelf 110 extends toward the root region 96. The tip shelf 110 is at least partially disposed between a portion of the rib 112 and the tip squealer pocket 114. The tip shelf 110 is disposed between a first wall 120 that at least partially defines the pressure side 92 of the airfoil body 90 and a second wall 122 that is disposed between the pressure side 92 and the suction side 94 of the airfoil body 90. The tip shelf 110 extends between the leading edge 100 and the trailing edge 102. The tip shelf 110 is spaced apart from the leading edge 100. The tip shelf 110 extends circumferentially between the first wall 120 and the second wall 122. The tip shelf 110 extends in the axial direction along the tip region 98 of the airfoil body 90.

The tip shelf 110 may be provided with a plurality of cooling holes 111 that extend at least partially through the tip shelf 110 and into an interior of the airfoil body 90.

The rib 112 is radially located within the tip region 98 of the airfoil body 90 such that the rib 112 is recessed below, radially inward toward the root section 96, and is radially spaced apart from the tip shelf 110. The rib 112 circumferentially extends between the first wall 120 and a third wall 124 that at least partially defines the suction side 94. The rib 112 extends axially from the trailing edge 102 towards the leading edge 100. The rib 112 is spaced apart from and does not intersect with or contact the leading edge 100.

The rib 112 is spaced apart from and radially inward from the tip shelf 110 and a tip surface 126. The tip surface 126 circumferentially extends between the second wall 122 and the third wall 124 at the tip region 98. The tip surface 126 is disposed substantially parallel to but not coplanar with the tip shelf 110. The tip surface 126 is radially spaced apart from the tip shelf 110.

The rib 112 is disposed in a substantially non-parallel relationship with the tip shelf 110 and the tip surface. The rib 112 is disposed closer to the trailing edge 102 than the leading edge 100. The rib 112 is located between the root region 96 and the tip shelf 110. The rib 112 is at least partially formed by the first wall 120.

The tip squealer pocket 114 is at least partially defined by the second wall 122, a third wall 124, and a pocket surface 128 that radially extends between the second wall 122 and the third wall 124. The pocket surface 128 is spaced apart from the tip surface 126. The pocket surface 128 is disposed substantially parallel to but not coplanar with the tip surface 126. The pocket surface 128 is radially spaced apart from the tip shelf 110 and the tip surface 126.

The tip squealer pocket 114 is radially recessed within the tip region 98 of the airfoil body 90. The tip squealer pocket 114 is at least partially disposed between the suction side 94 and the tip shelf 110. The tip squealer pocket 114 is disposed between the third wall 124 that at least partially defines the suction side 94 of the airfoil body 90 and the second wall 122. The tip squealer pocket 114 extends circumferentially between the second wall 122 and the third wall 124. The tip squealer pocket 114 extends in a direction from the leading edge 100 toward the trailing edge 102. In at least one embodiment, an extension wall 129 circumferentially extends between the second wall 122 and the third wall 124. The extension wall 129 radially extends between the root region 96 and the tip region 98.

The tip squealer pocket 114 may be provided with a plurality of cooling holes 115 that extend at least partially through the tip squealer pocket 114 into an interior of the airfoil body 90. The tip squealer pocket 114 significantly reduces the amount of thermal mass present proximate the tip region 98. The removal of the thermal mass due to the incorporation of the tip squealer pocket 114 will more closely match the transient thermal response of the tip region 98 and of the proximate first, second, and third walls 120, 122, 124. Further, the removal of thermal mass in the tip region 98 will reduce the amount of thermal transient compressive strain that is incurred during throttle acceleration and deceleration excursions of the gas turbine engine 20 that occur during engine operation throughout the aircraft mission flight profile. Furthermore, the removal of thermal mass resulting from the incorporation of the tip squealer pocket 114 will also reduce the local steady state thermal strain proximate the tip region 98.

Referring to FIGS. 3-6, the airfoil body 90 defines or includes a plurality of interior cavities to enable cooling of the airfoil 60. For example, as shown, the airfoil 60 includes a first pressure side hybrid skin core cavity 130, a second pressure side hybrid skin core cavity 132, a leading edge hybrid skin core cavity 134, a suction side hybrid skin core cavity 136, a forward radial flow cavity 138, a tip flag cavity 139 (see FIG. 7), a first serpentine flow cavity 140, a second serpentine flow cavity 142, a third serpentine flow cavity 144, and a trailing edge slot 146.

The hybrid skin core cavities are cooling passages or cooling cavities that are disposed immediately adjacent to a hot wall. The hybrid skin core cavities are the resultant hollow cooling passages or cavities that are created by a solid ceramic core. The solid ceramic core is leached out of the metal casting airfoil geometry leaving a hollow void or cooling cavity passage that may contain internal heat transfer augmentation features such as trip strips, turbulators, pedestals, pin fins, or the like. The resulting hybrid skin core cavity is positioned immediately adjacent to and is in close proximity to provide cooling to an external hot wall, e.g. the external wall of the airfoil body 90 such as an external surface of the first wall 120, the second 122, and the third wall 124, or an external heat load. The hybrid skin core cavity provides local cooling to a single hot wall of the airfoil body 90. As such, a hybrid skin core cavity may be disposed between or adjacent to a hot wall and a cold wall (e.g. the first pressure side hybrid skin core cavity 130, the second pressure side hybrid skin core cavity 132, the leading edge hybrid skin core cavity 134, the suction side hybrid skin core cavity 136, and the first serpentine flow cavity 140). Conventional cavities are positioned between and provide cooling to two hot walls (e.g. the second serpentine flow cavity 142 and the third serpentine flow cavity 144). A feed cavity is a cavity that is positioned between two cold walls or walls that are spaced apart from external hot surfaces or walls of the airfoil (e.g. the forward radial flow cavity 138).

Furthermore, the term "skin" refers to an external hot surface or wall of the airfoil (e.g. the first wall 120, the second wall 122, and the third wall 124). The external hot surface of wall of the airfoil may be arranged close to or proximate an external heat source, i.e. the hot gas path surface. In this sense the hybrid skin core cavities provide very localized convective cooling immediately adjacent to the local hot wall surface where the hybrid skin core cavity is positioned locally, typically only one airfoil surface (the pressure side 92, the suction side 94, or the leading edge 100) is influenced by the local convective cooling provided by the hybrid skin core cavity. In other words, only a one rib roughened wall surface with internal heat transfer augmentation features is providing active convective cooling of the hot wall immediately adjacent to the hybrid skin core cavity, while with conventional cooling cavity channels typically span across the airfoil from the pressure side to the suction side, and provide active convective cooling to both the pressure side and the suction side airfoil surfaces concurrently and have internal heat transfer augmentation features adjacent to both hot wall surfaces. In this sense these low aspect ratio cooling channels are referred to as "hybrid" skin core cavities.

The term "hybrid" in the context of the present disclosure refers to a hybrid skin core cavities that may contain internal heat transfer augmentation features near or immediately adjacent to a hot wall surface. The term "hybrid" also refers to providing cooling in local proximity to where the internal heat transfer augmentation feature is located. The hybrid skin core cavities have a low aspect ratio. In some embodiments, a hybrid skin core cavity may have a height to width ratio of less than about 0.8, while conventional height to width ratios that are greater than about 0.8. Further, in some embodiments, the leading edge leading edge hybrid skin core cavity 134 can have a height to width ratio of 0.8 or less. As used with respect to the describe ratio, a "height" of a cavity is a distance from an outer wall of the airfoil that partially defines the cavity to an inner wall that is internal to the airfoil (e.g., distance between first wall 120 and the internal partition wall 176 defining the first pressure side hybrid skin core cavity 130). Further, a width of a cavity is a dimension or length along one of the walls or surfaces that defines the height dimension.

The low aspect ratio and sizing of the hybrid skin core cavity geometry is typically not conducive to benefiting from the Coriolis effect due to blade rotation. In this sense, the hybrid skin core cavity passage vortices are small and therefore the enhancement of internal convective heat transfer attributed to the counter rotating vortices typically observed in larger cooling cavities is not present. In this sense the hybrid skin core cavity geometry is not able to leverage the additional augmentation typically observed in conventional cooling cavities. However due to their small cross sectional area, the hybrid skin core cavity geometry is conducive to generating high internal convective heat transfer coefficients due to the high flow per unit area (W/A) achievable with smaller cooling cavities. The hybrid skin core cavities may be formed by a hybrid skin core. A hybrid skin core refers to the physical core structure that exists after core die injection. The hybrid skin core is used to create the final part internal features and represents the negative of the final part. The hybrid skin core typically is made of a silica ceramic or alumina ceramic matrix material. It can also be made from RMC material which is a molybdenum based core material. The hybrid skin core material is typically in the form of a slurry and then is fired to create a solid ceramic core body that is then placed in a wax mold and injected to create the external airfoil shape, platform, neck, and attachment.

Figure 6:
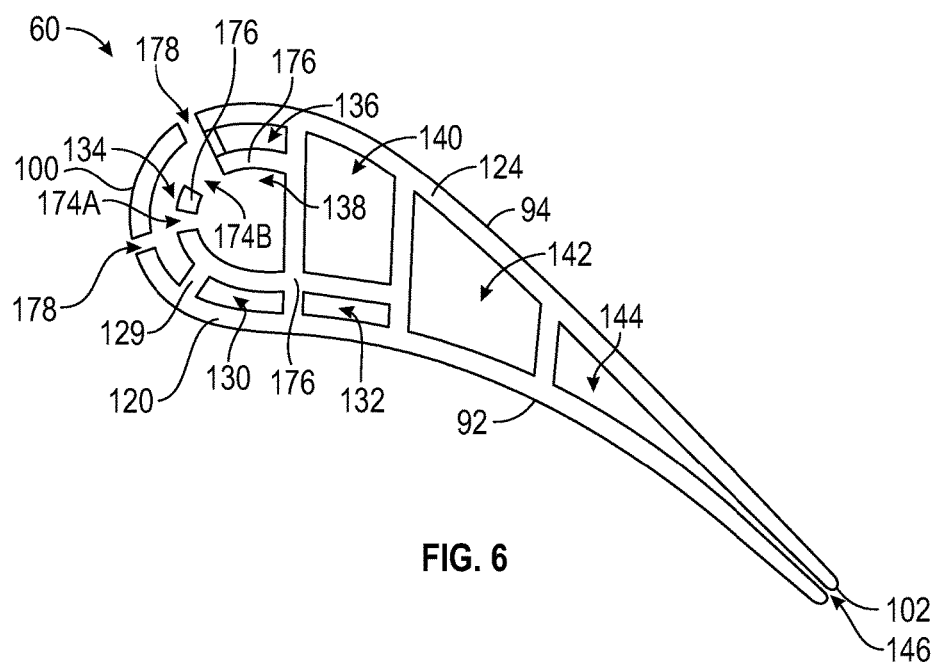
FIG. 6 is a partial cross-sectional view of the airfoil as viewed along the line 6-6 shown in FIG. 3.
Figure 10:
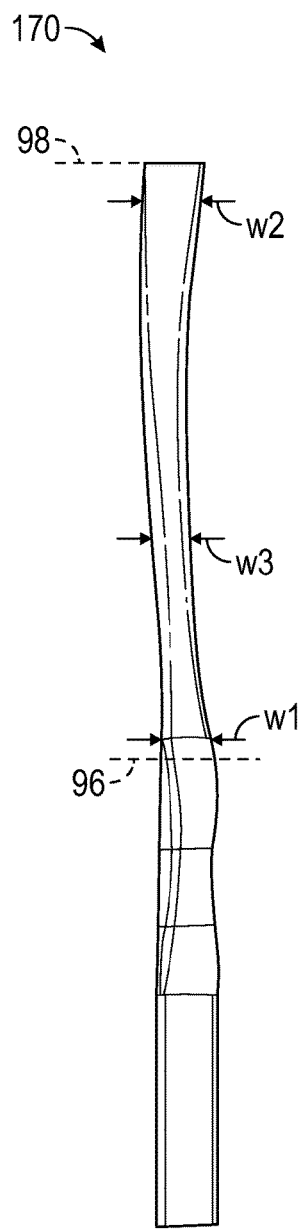
FIG. 10 is a perspective view of a suction side hybrid skin core.

As shown in FIG. 6, the trailing edge slot 146 may be incorporated as an integral cooling passage comprising one of the legs of the aft flowing serpentine circuit. In this scenario the serpentine design configuration is incorporated with the cooling passages of the trailing edge slot 146 that supplies a trailing edge slot configuration that provides convective cooling at the trailing edge 102 of the airfoil 60. In some embodiments the first, second, and third serpentine flow cavities 140, 142, 144 may form a continuous serpentine flow cavity within the airfoil 60 that are independent and segregated from any other cooling circuits within the airfoil 60. A separate independently fed trailing edge core cavity may be incorporated to supply cooling air to the trailing edge slot 146.

The configuration of the serpentine flow cavities 140, 142, 144 can take advantage of the radially oriented hybrid skin core cavities 130, 132, 134, 136 used in high heat load areas of the airfoil. That is, one or more of the serpentine flow cavities 140, 142, 144 may be positioned and oriented within high heat load areas of the airfoil 60. For example, as described herein and below, a pressure side hybrid skin core cavity 130, 132 negates the effects of locally high external heat flux that is typically present along the airfoil pressure side 92. In this instance the cooling air temperature heat pick up in the serpentine flow cavities 140, 142, 144 is mitigated by the shielding provided by the radially oriented hybrid skin core cavities 130, 132 adjacent to the first up pass of the first serpentine flow cavity 140. Accordingly, the overall convective cooling flow requirements may be reduced in the subsequent serpentine cavities 142, 144 due the reduction in cooling air temperature heat pickup. In some configurations, the airfoil 60 may be predominantly convectively cooled, thereby enabling the tailoring of the cooling air heat pickup to produce a more isothermal metal temperature distribution along the external airfoil pressure side 92, suction side 94, airfoil tip 98, leading edge 100, and trailing edge 102 surfaces, resulting in an airfoil cooling design that is more evenly balanced from a durability life perspective. The aft flowing serpentine also enables the film cooling flow to be optimally distributed to address airfoil and endwall life limiting locations. In this scenario a limited amount of film cooling may be required to mitigate locally high external heat flux and excessive metal temperatures conditions both within and along the airfoil and endwall surfaces. The reduction in both convective and film cooling flow requirements to achieve durability life goals are beneficial to both turbine component and stage aerodynamic efficiency. In some embodiments, having an aft flowing serpentine feed the trailing edge 102 of the airfoil 60 may reduce the total airfoil weight by eliminating a rib that would be needed for a dedicated trailing edge cooling cavity.

The first pressure side hybrid skin core cavity 130 and the second pressure side hybrid skin core cavity 132 extend radially from the root region 96 of the airfoil body 90 toward the tip region 98 and are located proximate the leading edge 100 and proximate the pressure side 92. The first pressure side hybrid skin core cavity 130 and the second pressure side hybrid skin core cavity 132 are spaced apart from each other proximate the tip region 98 (e.g., spaced axially apart along the pressure side 92). In at least one embodiment, the first pressure side hybrid skin core cavity 130 and the second pressure side hybrid skin core cavity 132 are joined together proximate the root region 96 and are provided with cooling air from a pressure side inlet cavity.

The first pressure side hybrid skin core cavity 130 and the second pressure side hybrid skin core cavity 132 are at least partially formed within the interior of the airfoil 60 and proximate the first wall 120. At the tip region 98, the first pressure side hybrid skin core cavity 130 and the second pressure side hybrid skin core cavity 132 each extend through the tip shelf 110 thus enabling fluid communication from the root region 96 to the tip region 98 through the interior of the airfoil 60.

Figure 5:
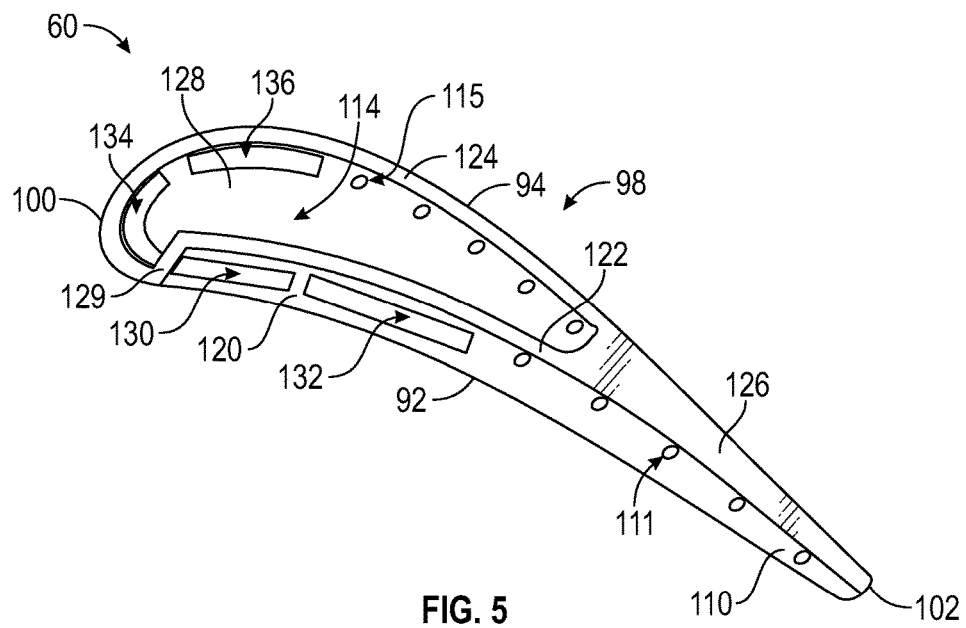
FIG. 5 is a top view of the airfoil.

The first pressure side hybrid skin core cavity 130 and the second pressure side skin core cavity 132 may have unique geometric shapes with varying cross sectional area as a function of radial and axial location within airfoil 60. In some instances it is desirable to taper the internal cooling cavity geometry in the radial direction as shown in FIGS. 5 and 6. The cooling air passages are geometrically tapered in the radial flowing cavities as the coolant flow enters the root region 96 and progresses toward the tip region 98. The predominantly radially flowing pressure side hybrid skin core cavities 130, 132 are designed to have constant and/or converging cavity flow areas. The taper in cavity areas are desirable from a thermal convective cooling perspective in that it allows for the tailoring of internal heat transfer augmentation features, such as turbulators, trip strips, pin fins, pedestals etc. In this scenario both the internal cavity pressure loss, convective heat transfer, and cooling air temperature can be tailored to thermally match the local radial and axial external heat flux distribution along the pressure side 92.

The first pressure side hybrid skin core cavity 130 and the second pressure side hybrid skin core cavity 132 receive cooling air from a pressure side inlet cavity that is disposed proximate the root region 96. The first pressure side hybrid skin core cavity 130 and the second pressure side hybrid skin core cavity 132 are configured to provide cooling to the tip shelf 110. Cooling air may be supplied from the root region 96 (e.g., from the pressure side inlet cavity), flow in a radial direction through the first and second pressure side hybrid skin core cavities 130, 132, and out at the tip region 98 and particularly at the tip shelf 110. In some configurations, the cooling may be slot film cooling, as shown FIG. 4 and FIG. 5.

The slot film cooling provided by the first pressure side hybrid skin core cavity 130 and the second pressure side hybrid skin core cavity 132 minimizes the potential of hot gas entrainment that may occur as a result of local vortices created at the tip region 98 of the airfoil 60. The continuous sheet of film cooling air that exits the first pressure side hybrid skin core cavity 130 and the second pressure side hybrid skin core cavity 132 at the tip shelf 110 mitigates the propensity of hot gas entrainment along the tip shelf 110 and the second wall 122 of the tip region 98. The slot film discharge flow from the first pressure side hybrid skin core cavity 130 and the second pressure side hybrid skin core cavity 132 is extremely effective in providing an insulating layer of film coolant due to the reduction in the strength of counter-rotating film vortices associated with slot geometry shapes and the orientation of the slot cavity exit geometry (e.g., slot geometry) of the first pressure side hybrid skin core cavity 130 and the second pressure side hybrid skin core cavity 132, relative to the local airfoil tip region 98 streamlines.

The exit slots of the first pressure side hybrid skin core cavity 130 and the second pressure side hybrid skin core cavity 132 are located adjacent to the radial extending (vertical) surface of the second wall 122 that in part defines the tip shelf 110 and are coincident with the exposed surface of the second wall 122. The location of the slot exits of the first pressure side hybrid skin core cavity 130 and the second pressure side hybrid skin core cavity 132 at the tip shelf 110 are selected to ensure that the film cooling air is ejected along the radially extended surface and remains attached to the radially extending (vertical) second wall 122. The cooling air is expelled in a predominately radial orientation and is then diffused and expanded circumferentially and axially in the leeward direction toward the horizontal surface of the tip shelf 110 of the airfoil 60 proximate the tip region 98 and ultimately toward the suction side 94 proximate the trailing edge 102. The diffusion of the film cooling hole geometry in the leeward direction enables the cooling air flow to be discharged in a direction of favorable pressure gradient across the horizontal tip surface of the airfoil 60 proximate the tip region 98.

Referring to FIGS. 7-9 and 11, the first pressure side hybrid skin core cavity 130 and the second pressure side hybrid skin core cavity 132 as well as the pressure side inlet cavity may be formed by a pressure side hybrid skin core 150. The pressure side hybrid skin core 150 may be used during a manufacturing process to form the airfoil 60 having the above described cavities (e.g., first and second pressure side hybrid skin core cavities 130, 132). In accordance with some embodiments, the manufacturing process is an investment casting process, although alternative manufacturing techniques, including advanced additive manufacturing processes, may be utilized to fabricate ceramic silica or alumina core bodies and/or directly additively manufacture airfoil geometries using nickel based powders to produce airfoil internal cooling geometries and design configurations in accordance with embodiments of the present disclosure.

Figure 11:
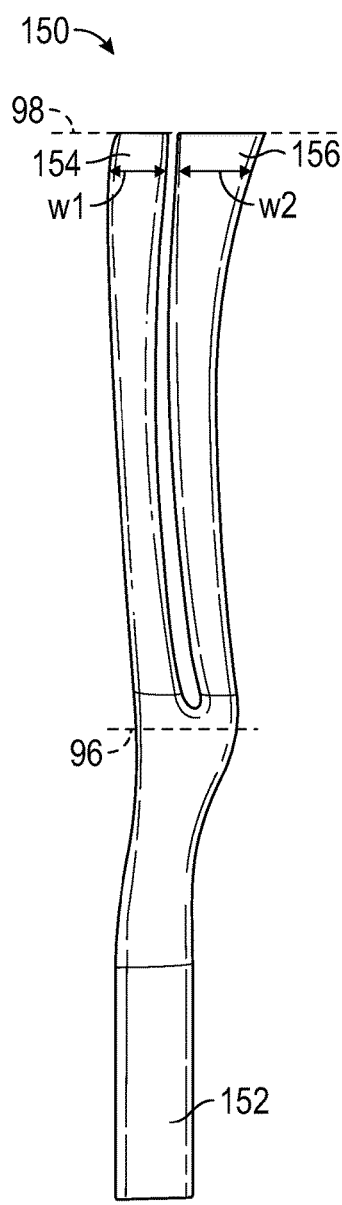
FIG. 11 is a perspective view of a pressure side hybrid skin core.
Figure 12:
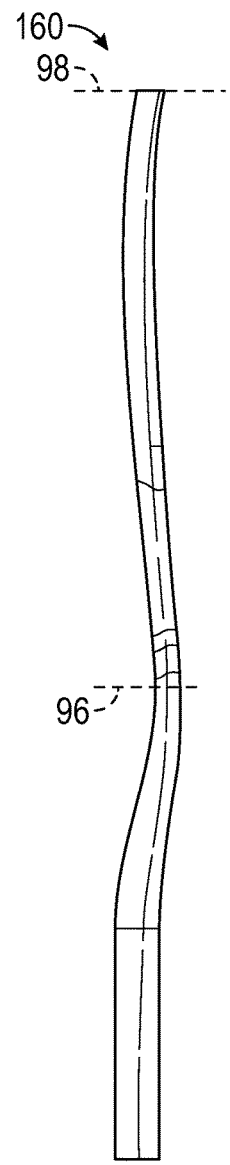
FIG. 12 is a perspective view of a leading edge hybrid skin core.
Figures 13, 14:
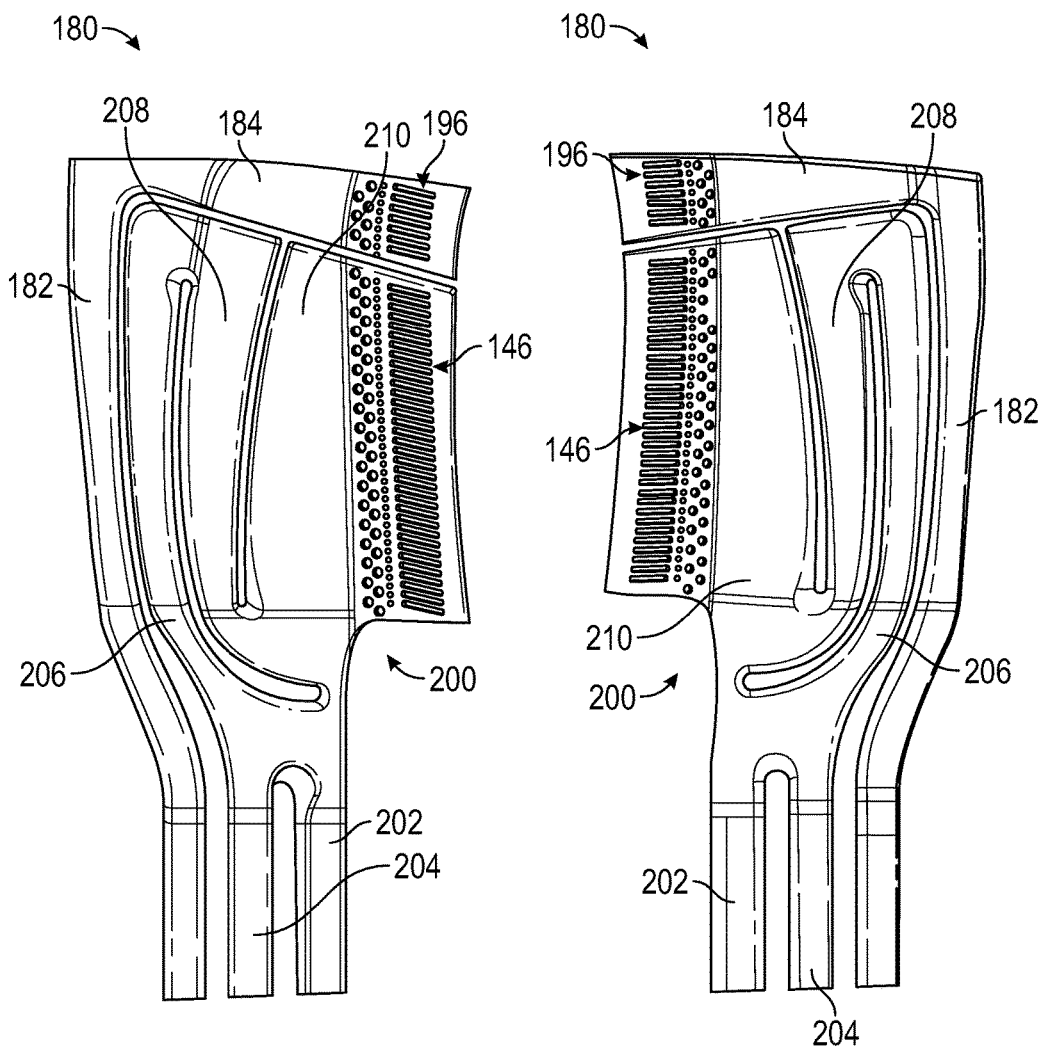
FIG. 13 is a first side perspective view of a first arrangement of a radial flow core and a serpentine flow core.
FIG. 14 is a second side perspective view of the first arrangement of the radial flow core and the serpentine flow core.

Referring to FIG. 11, the pressure side hybrid skin core 150 includes a first trunk 152, a first branch 154, and a second branch 156. The first trunk 152 extends toward the tip region 98. The first trunk 152 is configured to form or define at least a portion of the pressure side inlet cavity. The first branch 154 and the second branch 156 extend from an end of the first trunk 152 toward the tip shelf 110 of the tip region 98. The first branch 154 is configured to form or define the first pressure side hybrid skin core cavity 130. The second branch 156 is configured to form or define the second pressure side hybrid skin core cavity 132.

The first branch 154 has a first profile and the second branch 156 has a second profile. In some embodiments, the first profile and the second profile have different core profile shapes and/or form different cooling cavity geometries as it pertains to the aspect ratio of the channel, e.g. the height and width (H/W). That is, in some embodiments, the second profile can have a geometric cavity shape that is different from the first profile geometric cavity shape. In such configurations, the first branch 154 may have a first width, w1 (in the axial direction) proximate a distal end disposed opposite a proximal end to the first trunk 152 and the second branch 156 has a second width, w2, (in the axial direction) proximate the distal end disposed opposite a proximal end to the first trunk 152. In some embodiments, the second width, w2, is greater than the first width, w1. In some embodiments, the second pressure side hybrid skin core cavity 132 may have a larger or longer exit opening in the tip shelf 110 than the first pressure side hybrid skin core cavity 130. That is a width of the second pressure side hybrid skin core cavity 132 at the tip region 98 may be, in some embodiments, larger than a width of the first pressure side hybrid skin core cavity 130 at the tip region 98. Conversely in some embodiments the first width w1 may be larger than the second width w2. The geometry shape and size requirements are defined based on the cooling flow available and the external heat load distribution and thermal cooling effectiveness requirements needed to meet airfoil durability metal temperature and life requirements.

Similarly the cavity or channel height of the first pressure side hybrid skin core cavity 130 may be different than the cavity or channel height of the second pressure side hybrid skin core cavity 132. Additionally the pressure side hybrid skin core cavities 130, 132 cavity channel shapes may also be unique and consist of varying degrees of curvature for the internal cavity surface immediately adjacent to the external wall of the pressure side 92. Likewise the opposite wall surface immediately adjacent to an internal partition wall 176 of the first and second pressure side hybrid skin core cavities 130, 132 may also comprise of a unique curvature different than the first wall surface immediately adjacent to the external wall of the pressure side 92. In this manner the radial cavity Reynolds Number, Mach Number, internal convective heat transfer, pressure loss, and coolant temperature heat pick up can be uniquely optimized to better balance differences in the local heat flux distribution along the external airfoil pressure side 92.

In some embodiments, the pressure side hybrid skin core 150 may be provided with features that may form or define internal convective heat transfer augmentation features within the pressure side inlet cavity, the first pressure side hybrid skin core cavity 130, and/or the second pressure side hybrid skin core cavity 132. The internal convective heat transfer augmentation features may be, for example, trip strips, turbulators, pin fins, and/or pedestals that enable enhanced thermal cooling effectiveness levels to be achieved.

Referring back to FIGS. 3-6, the leading edge hybrid skin core cavity 134 extends from the root region 96 towards the tip region 98 of the airfoil body 90. The leading edge hybrid skin core cavity 134 is located proximate the leading edge 100 of the airfoil body 90. The leading edge hybrid skin core cavity 134 is axially and circumferentially spaced apart from the first pressure side hybrid skin core cavity 130. The leading edge hybrid skin core cavity 134 is axially spaced apart from the leading edge 100. The extension wall 129 is disposed between the first pressure side hybrid skin core cavity 130 and the leading edge hybrid skin core cavity 134.

In some embodiments, as shown in FIGS. 5-6, the leading edge hybrid skin core cavity 134 has an arcuate shape, contour, and/or geometry that follows or matches the local shape, contour, and/or curvature of the local external leading edge aerodynamic geometry of the surface of the leading edge 100. In other embodiments, the leading edge hybrid skin core cavity 134 may be formed having a shape, contour, and/or geometry that is different from the shape, contour, and/or geometry of the leading edge. The geometric attributes of the leading edge hybrid skin core cavity 134 can be modified as described previously for the first and second pressure side hybrid skin core cavities 130, 132. Similarly, the radial cavity Reynolds Number, Mach Number, internal convective heat transfer, pressure loss, and coolant temperature heat pick up can be uniquely optimized to better balance differences in the local heat flux distribution along the external surface of the leading edge 100.

The leading edge hybrid skin core cavity 134 is at least partially defined within a portion of the third wall 124 that extends from or is disposed proximate the leading edge 100. The leading edge hybrid skin core cavity 134 receives cooling air from a leading edge inlet cavity that is disposed proximate the root region 96. The leading edge hybrid skin core cavity 134 is configured to provide cooling flow within tip squealer pocket 114. Cooling air may be supplied from the root region 96 (e.g., from the leading edge inlet cavity), flow in a radial direction through the leading hybrid skin core cavity 134, and out at the tip region 98 and particularly within the leading edge portion of the tip squealer pocket 114. In some configurations, the cooling may be slot film cooling, as shown FIG. 4 and FIG. 5.

The leading edge hybrid skin core cavity 134 opens from the interior of the airfoil body 90 and is discharged into the recessed portion of the tip squealer pocket 114, as shown in FIGS. 4-5. Cooling air flowing through the leading edge hybrid skin core cavity 134 exits into the leading edge portion of the tip squealer pocket 114 immediately adjacent to the first wall 120 located proximate the leading edge 100.

The leading edge hybrid skin core cavity 134 receives cooling air from a leading edge inlet cavity that is located proximate the root region 96. The leading edge hybrid skin core cavity 134 is fluidly connected to the leading edge inlet cavity. The leading edge hybrid skin core cavity 134 is configured to provide tip cooling film to the leading edge portion of the tip squealer pocket 114. The film cooling air that exits through the slot of the leading edge hybrid skin core cavity 134 attaches (or flows across) to the third wall 124. The location of the slot exit of the leading edge hybrid skin core 134 is positioned immediately adjacent, coincident, and tangent to the leading edge portion of the third wall 124 to ensure that the film cooling air is ejected along the radially extended surface and stays attached to the leading edge portion of the third wall 124. The cooling air is expelled in a predominately radial orientation in the leading edge portion of the tip squealer pocket 114. The film cooling from the exit slot of the leading hybrid skin core 134 then migrates over the horizontal surface of the leading edge portion of the third wall 124 of the airfoil 60 proximate the tip region 98 and ultimately toward the suction side airfoil surface 94.

Additionally, as the film cooling air is expelled in a predominately radial orientation out of the slot exit of the leading edge hybrid skin core cavity 134 into the tip squealer pocket 114 it enables the cooling air to be discharged in a direction of favorable pressure gradient across the tip squealer pocket 114. A portion of the cooling air that exits through the leading edge hybrid skin core cavity 134 is dispersed into the plenum of the cavity of the tip squealer pocket 114, resulting in some diffusion of the tip slot cooling flow. The dispersion of the slot exit flow provides a buffer of insulating air between hot external gas streams and the third wall 124 in order to maintain a minimal gap clearance between the tip region 98 of the airfoil 60 and the blade outer air seal 82 for optimal turbine performance and efficiency. The cooling air ensures that the metal temperature proximate the tip squealer pocket 114 remains uniformly cooled in order to minimize local compressive strain induced by locally high thermal temperature gradient induced by non-uniformities in thermal cooling performance and transient metal temperature response rates incurred during engine operation. It will be appreciated that any or all cavities with exits proximate the tip of the airfoil may be positioned such that the exiting air exits into a pocket or along the tip surface immediately adjacent one or more walls or surfaces. Further, in some embodiments, the exits of the cavities described herein at the tip of the airfoil may be recessed from the actual physical tip of the airfoil (e.g., as shown in FIGS. 3-4). That is, the air exiting one or more of the cavities may not be along the tip surface 126, but rather may be radially inward therefrom (e.g., within a pocket). Such positioned exiting of air may be configured such that it does not interfere with or impact an abrading surface of the airfoil (e.g., a tip surface that interacts with a BOAS). However, in other embodiments, the exiting air, and thus the position of the exits, may be arranged to exit direction at, on, or along the tip surface 126.

Referring to FIGS. 7-9 and 12, the leading edge hybrid skin core cavity 134 is formed by a leading edge hybrid skin core 160. The leading edge hybrid skin core 160 may be used during a manufacturing process to form the leading edge hybrid skin core cavity 134 within an airfoil body 90. In accordance with some embodiments, the manufacturing process is an investment casting process, although alternative manufacturing techniques, including advanced additive manufacturing processes, may be utilized to fabricate ceramic silica or alumina core bodies and/or directly additively manufacture airfoil geometries using nickel based powders to produce form blade airfoil internal cooling geometries and design configurations in accordance with embodiments of the present disclosure.

The leading edge hybrid skin core 160 is circumferentially and axially spaced apart from the pressure side hybrid skin core 150 when positioned to form an airfoil (e.g., as shown in FIGS. 7-9). The leading edge hybrid skin core 160 extends from the root region 96 toward the tip region 98. In some embodiments, and noted above, the leading edge hybrid skin core 160 may have a geometry profile that is uniformly offset and follows or mimics the external leading edge profile of the leading edge 100 of the airfoil body 90. The geometric shape of the leading edge hybrid skin core 160 may also be unique and consist of varying degrees of surface curvature in order to optimize the external wall thickness distribution adjacent to the leading edge 100. Likewise the opposite wall surface immediately adjacent to the internal partition wall 176 of the leading edge hybrid skin core cavity 134 may also comprise of a unique curvature different than the first wall surface immediately adjacent to the external wall of the leading edge 100. In this manner the radial cavity Reynolds Number, Mach Number, internal convective heat transfer, pressure loss, and coolant temperature heat pick up can be uniquely optimized to better balance differences in the local heat flux distribution along the external airfoil leading edge 100. A portion of the leading edge hybrid skin core 160 is disposed generally parallel to the first trunk 152 of the pressure side hybrid skin core 150. As shown in FIGS. 5 and 7-8, a portion of the leading edge hybrid skin core 160 that is disposed proximate the tip region 98 has a complementary profile relative to the profile of the first branch 154 of the pressure side hybrid skin core 150.

In some embodiments, the leading edge hybrid skin core 160 may include various types of geometric features that generate and promote near wall flow vorticities of the internal cooling air in order to augment local convective heat transfer. The internal convective heat transfer augmentation features may be located within the leading edge hybrid skin core 160 and/or the leading edge hybrid skin core cavity 134. The internal convective heat transfer augmentation features such as trip strips, turbulators, pin fins, and/or pedestals enable an increase in the local leading edge thermal cooling effectiveness.

Referring to FIG. 6, backside impingement cooling hole features may be incorporated between the forward radial flow cavity 138 and the leading edge hybrid skin core cavity 134. Accordingly, in some embodiments, a significant increase in the backside convective heat transfer coefficient can be achieved. The low aspect ratio geometry of the leading edge hybrid skin core cavity 134 significantly reduces the impingement distance and places the impingement jets emanating from the forward radial flow cavity 138 in close proximity to the backside of the internal leading edge wall surface of the leading edge hybrid skin core cavity 134 immediately adjacent to the leading edge 100. The quantity, size, and shape of the impingement geometries may be circular, elliptical, oblong, tear drop, or any multi-faceted geometric design configurations. Additionally the leading edge impingement holes may be of a singular row, as shown in FIG. 6, and may be either aligned and/or offset relative to each adjacent impingement cooling hole design features. In some configurations the leading edge impingement array may constitute of at least one singular row, or multiple rows distributed circumferentially along the internal partition wall 176. The leading edge impingement holes may be aligned, staggered, and/or of varying radial and circumferential pitch distributions, size, and shape dependent on geometric, heat load, cooling flow, and the leading edge 100 thermal cooling effectiveness and durability metal temperature life requirements.

In some embodiments showerhead film cooling holes may be incorporated in conjunction with a leading edge impingement cooling design and the internal convective heat transfer at the entrance or inlet of the leading edge showerhead film cooling holes will be further enhanced. The additional internal convective heat transfer augmentation at the entrance of the leading edge showerhead film cooling holes are a result of the increased vorticity and turbulent mixing of the coolant flow produced by the upstream impingement cooling jets. The net effect associated with the augmentation of the internal backside impingement heat transfer and the enhancement of convective heat transfer at the inlet of the leading edge film cooling holes further increases the thermal cooling effectiveness and durability capability along the leading edge 100.

The leading edge hybrid skin core 160 enables the reduction in local leading edge external wall thickness requirements adjacent to the leading edge 100. The significantly larger aerodynamic leading edge diameter enables the shape, curvature, and contour of the leading edge hybrid skin core cavity 134 to more closely match the adjacent external leading edge airfoil geometry 100.

Conversely conventional airfoil aerodynamic geometries are not conducive to the implementation of a leading edge hybrid skin core cavity 134 that may result in a thinner local leading edge external wall thickness. Therefore such leading edge cooling cavity geometries, whether for radial flow and/or impingement leading edge cooling configurations, have local leading edge external walls that are significantly thicker by comparison. The increased leading edge wall thickness is driven by both the aerodynamic leading edge airfoil geometry 100 and the minimum core geometry size limitations associated with core die manufacturing, core producibility and casting process constraints, as well as the necessity to absorb impact from particulate matter present in the freestream during engine operation.

In accordance with embodiments of the present disclosure, the external wall thickness along the leading edge 100 is reduced but the local thermal performance of the leading edge 100 will not be compromised as a result of a puncture or other foreign or domestic object damage. The pressure of the coolant air within the leading edge hybrid skin core cavity 134 is greater than the local external gas path pressure, ensuring that a positive out flow condition will always exist.

The leading edge hybrid skin core cavity 134 is in close proximity to the leading edge 100 and immediately adjacent to high external heat flux location along the stagnation region proximate the leading edge 100 of the airfoil 60. The reduction in local leading edge wall thickness combined with the high internal convective heat transfer achievable with the leading edge hybrid skin core cavity 134 results in a significant increase in the local thermal cooling effectiveness. Consequently the improved heat transfer characteristics of the leading edge design configuration results in cooler operating metal temperatures and increased durability capability at similar and/or reduced cooling flow rates relative to conventional leading edge cooling design configurations.

The thinner external leading edge wall thickness also reduces the weight of the airfoil 60 and subsequent airfoil blade pull on the rotating disk attachment and rotor. The increase in local leading edge thermal cooling effectiveness achievable in accordance with the embodiments of the present disclosure will significantly reduce the amount of cooling airflow necessary to achieve turbine airfoil metal temperature and durability life requirements. The reduction in cooling flow requirements directly translates into increased turbine stage and thermodynamic cycle efficiency which directly improves the Total Specific Fuel Consumption (TSFC) of the overall propulsion system.

Referring back to FIGS. 3-6, the suction side hybrid skin core cavity 136 extends from the root region 96 towards the tip region 98 of the airfoil body 90. The suction side hybrid skin core cavity 136 is located proximate the suction side 94 of the airfoil body 90. The suction side hybrid skin core cavity 136 is spaced apart from the leading edge hybrid skin core cavity 134. The first pressure side hybrid skin core cavity 130, the second pressure side hybrid skin core cavity 132, the leading edge hybrid skin core cavity 134, and the suction side hybrid skin core cavity 136 are arranged immediately adjacent about a perimeter of the forward radial flow cavity 138 in order to form a shielding arrangement as shown in FIGS. 6, 17, and 18. The shielding arrangement thermally protects and insulates the forward radial flow cavity 138 from the high external heat flux present immediately along the pressure side 92, the leading edge 100, and the suction side 94.

The shielding arrangement of the radially oriented hybrid skin cavities 130, 132, 134, 136 significantly reduces the coolant air temperature heat pick up that occurs in the forward radial flow cavity 138. In this instance the cooling air temperature increase in the forward radial flow cavity 138 is predominately a function of solid body pumping induced by the inertial forces generated by the rotating airfoil only. Whereas the air temperature increase in the cooling cavities immediately adjacent to the hot external airfoil wall surfaces (e.g., cavities 130, 132, 134, 136) incur a higher rate of cooling air temperature increase, which is a result of both solid body pumping induced by the inertial forces generated by the rotating airfoil, as well as, the heat addition due to the energy transfer of heat from the hotter external airfoil walls convecting into the cooler working fluid within the radially flowing hybrid skin core cavities 130, 132, 134, 136.

The absolute temperature of the cooling air in the forward radial flow cavity 138 will be significantly lower as it enters the tip flag cavity 139. The increase in temperature gradient between the hot freestream external gas and the internal working cooling fluid provides for a more efficient use of the available cooling air flow to achieve the desired airfoil operating metal temperature conditions necessary to meet durability life requirements. The cooling air temperature rise will be significantly greater in the radially oriented skin core cavities forming the shielding arrangement, e.g. the first pressure side hybrid skin core cavity 130, the second pressure side hybrid skin core cavity 132, the leading edge hybrid skin core cavity 134, the suction side hybrid skin core cavity 136. As shown in FIG. 6, the cavities within the airfoil 60, that form the first serpentine flow cavity 140, the second serpentine flow cavity 142, and the third serpentine flow cavity 144, will also observe a decrease in the cooling air heat pick up due to the thermal shielding provided by the second pressure side hybrid skin core cavity 132. The decrease in cooling air heat pick up in the serpentine passages results in lower local hot wall metal temperatures and increased durability life capability. The reduction in cooling air temperature heat pick up due to the thermal shielding provided by the pressure side hybrid skin core cavity 132 enables the cooling air flow requirements for the serpentine circuit to be reduced while maintaining local metal temperatures consistent with an unshielded serpentine cooling design configuration at constant durability life. The reduction in serpentine cooling flow requirements directly translates into increased turbine stage and thermodynamic cycle efficiency which directly improves the Total Specific Fuel Consumption (TSFC) of the overall propulsion system.

The tip exit slot formed by the suction side hybrid skin core cavity 136 is at least partially defined within a portion of the third wall 124, as shown in FIGS. 3 and 4. The location of the suction side hybrid skin core cavity 136 opens from the interior of the airfoil body 90 and is discharged into the recessed portion of the tip squealer pocket 114, as shown in FIGS. 4-5. The suction side hybrid skin core cavity 136 is configured to provide cooling flow within tip squealer pocket 114. Cooling air may be supplied from the root region 96 (e.g., from the suction side hybrid inlet cavity), and flows in a radial direction through the suction side hybrid skin core cavity 136, and out at the tip region 98 and particularly within the suction side portion of the tip squealer pocket 114. In some configurations, the cooling may be slot film cooling, as shown FIG. 4 and FIG. 5.

The suction side hybrid skin core cavity 136 exits into the tip squealer pocket 114 and is located immediately adjacent, coincident, and tangent to the suction side portion of the third wall 124 in order to ensure that the slot film cooling air is ejected along the radially extended surface and stays attached to the suction side portion of the third wall 124. The cooling air is expelled in a predominately radial orientation along the suction side region of the tip squealer pocket 114. The film cooling from the exit slot of the suction side hybrid skin core 136 is then partially diffused into the recessed portion of the tip squealer pocket 114 and then migrates over the horizontal surface of the suction side portion of the third wall 124 of the airfoil 60 proximate the tip region 98 and ultimately toward the suction side 94.

Referring to FIG. 9, the suction side hybrid skin core cavity 136 receives cooling air from a suction side inlet cavity that is disposed proximate the root region 96. The suction side hybrid skin core cavity 136 is configured to provide tip cooling film into the tip squealer pocket 114. The cooling air that exits through the suction side hybrid skin core cavity 136 attaches to the third wall 124. The cooling air that exits through the suction side hybrid skin core cavity 136 is expelled in a predominately radial orientation and enables the cooling air to be discharged in a direction of favorable pressure gradient across the tip squealer pocket 114. The cooling air that exits through the suction side hybrid skin core cavity 136 provides a buffer of insulating air between hot external gas streams and the third wall 124 in order to maintain a minimal gap clearance between the tip region 98 and the blade outer air seal 82 for optimal turbine performance and efficiency. The film cooling air ejected into the recessed portion of the tip squealer pocket 114 and the surrounding radially extending external airfoil walls 122, 124 proximate the leading edge 100 ensures that the metal temperature proximate the tip squealer pocket 114 remains uniformly cooled in order to minimize local compressive strain induced by locally high thermal temperature gradient induced by non-uniformities in thermal cooling performance and transient metal temperature response rates incurred during engine operation.

Referring to FIGS. 7-10, the suction side hybrid skin core cavity 136 is formed by a suction side hybrid skin core 170. The suction side hybrid skin core 170 may be used during a manufacturing process to form the leading edge hybrid skin core cavity 134 within an airfoil body 90. In accordance with some embodiments, the manufacturing process is an investment casting process, although other manufacturing techniques, including advanced additive manufacturing processes, may be utilized to fabricate ceramic silica or alumina core bodies and/or directly additively manufacture airfoil geometries using nickel based powders to produce form blade airfoil internal cooling geometries and design configurations.

The suction side hybrid skin core 170 is spaced apart from the leading edge hybrid skin core 160. The suction side hybrid skin core 170 extends from the root region 96 toward the tip region 98. In some embodiments, the suction side hybrid skin core 170 may have a width that varies along the radial length of the suction side hybrid skin core 170, e.g., forming a variable width cavity between the tip squealer pocket 114 and the suction side inlet cavity. For example, the suction side hybrid skin core 170 may be formed with a first width, w1, at an end proximate the root region 96, a second width w2 at an end proximate the tip region 98, and a third width w3 located between the root region 96 and the tip region 98. In some embodiments, the first width w1 is greater than the second width w2. Further, in some embodiment, the first width w1 is greater than the third width w3. In still further embodiments, the third width w3 is less than the first width w1 and the second width w2. Those of skill in the art will appreciate that these relative widths of the first, second, and third widths of the suction side hybrid skin core 170 are for example and various other width relationships may be employed without departing from the scope of the present disclosure. For example, in various embodiments, the above described first, second, and third widths can be similarly applied to the other hybrid skin cores described herein (e.g., hybrid skin cores 150, 160, etc.).

Additionally the cavity or channel height of the suction side hybrid skin core cavity 136 may also be of varying channel heights in the predominately stream-wise radial direction of the internal cavity cooling flow. Further, the shape of the suction side hybrid skin core cavity 136 may also be unique and consist of varying degrees of curvature for the internal cavity surface immediately adjacent to the external wall of the suction side 94. Likewise the opposite wall surface immediately adjacent to the internal partition wall 176 of the suction side hybrid skin core cavity 136 may also comprise of a unique curvature different than the first wall surface immediately adjacent to the external wall of the suction side 94. In this manner the radial cavity Reynolds Number, Mach Number, internal convective heat transfer, pressure loss, and coolant temperature heat pick up can be uniquely optimized to better balance differences in the local heat flux distribution along the external surface of the suction side 94.

The suction side hybrid skin core 170 may be provided with features that may form or define internal convective heat transfer augmentation features within the suction side inlet cavity and/or the suction side hybrid skin core cavity 136. The internal convective heat transfer augmentation features may be, for example, trip strips, turbulators, pin fins, and/or pedestals that enable enhanced thermal cooling effectiveness levels to be achieved.

The forward radial flow cavity 138 extends from the root region 96 towards the tip region 98 of the airfoil body 90. The forward radial flow cavity 138 is radially recessed inboard with respect to the pocket surface 128 within the tip squealer pocket 114. The forward radial flow cavity 138 is located between the leading edge hybrid skin core cavity 134 and the first serpentine flow cavity 140. The forward radial flow cavity 138 is located between the first pressure side hybrid skin core cavity 130 and the suction side hybrid skin core cavity 136.

In some embodiments, the forward radial flow cavity 138 is formed with smooth internal walls that do not contain internal convective features, although in some embodiments such features may be provided. The forward radial flow cavity 138 receives cooling air from a forward radial flow inlet cavity that is located proximate the root region 96. The forward radial flow cavity 138 provides a tip cooling film at significantly reduced temperatures compared to the cooling film that exits from the first pressure side hybrid skin core cavity 130, the second pressure side hybrid skin core cavity 132, the leading edge hybrid skin core cavity 134, and/or the suction side hybrid skin core cavity 136. Heat pickup of the cooling air that flows through the forward radial flow cavity 138 is predominantly driven by solid body pumping induced by the inertial forces generated by the rotation of the airfoil 60. The reduction in cooling air temperature within the forward radial flow cavity 138 creates a larger temperature difference as it enters the axial tip flag cavity 139. The increase in temperature gradient between the hot freestream external gas and the internal working cooling fluid provides for a more efficient use of the available cooling air flow to achieve the desired airfoil operating metal temperature conditions necessary to meet durability life requirements.

Referring to FIG. 6, the forward radial flow cavity 138 is optionally fluidly connected to the leading edge hybrid skin core cavity 134 by one or more resupply openings 174 A,B. The impingement resupply openings 174 A,B extend through the internal partition wall 176 that is located or positioned between and separates the forward radial flow cavity 138 and the leading edge hybrid skin core cavity 134. In some embodiments, a single resupply opening may extend through the internal partition wall 176. The internal partition wall 176 and the first wall 120 at least partially define the first pressure side hybrid skin core cavity 130 and the second pressure side hybrid skin core cavity 132. The internal partition wall 176 and the third wall 124 at least partially define the leading edge cavity 134. The internal partition wall 176 and the third wall 124 at least partially define the suction side hybrid skin core cavity 136. Segments of the internal partition wall 176 at least partially define the radial flow cavity 138. Further, in some embodiments, the internal partition wall 176 can extend within and/or through the airfoil beyond what is shown in FIG. 6. Additionally, multiple internal partition walls can be formed within the airfoil to form multiple feed cavities. Further, example, an internal partition wall can extend adjacent into and/or to the serpentine cavities, feed cavities, hybrid skin core cavities, conventional cavities, etc. In one non-limiting example, the presently shown internal partition wall 176 can extend toward the trailing edge 102 into the second serpentine flow cavity 142, and in some embodiments, may divide the second serpentine flow cavity 142 into two hybrid skin core cavities (in comparison to a conventional cavity as presently shown in FIG. 6. Similarly, in some embodiments, the presently shown internal partition wall 176 can extend toward the trailing edge 102 into the first serpentine flow cavity 140 on the suction side 94 (e.g., adjacent the third wall 124) to form an additional hybrid skin core cavities on the suction side 94 and further form a feed cavity between this additional suction side hybrid skin core cavity and the second pressure side hybrid skin core cavity 132. Those of skill in the art will appreciate that the internal partition wall 176 can form various walls or structures to define one or more cavities of varying type (e.g., hybrid skin core cavity, feed cavity, conventional cavity).

The internal partition wall 176 separates the first pressure side hybrid skin core cavity 130, the leading edge cavity 134, the suction side hybrid skin core cavity 136, and the first serpentine flow cavity 140 from the radial flow cavity 138, such that the internal partition wall 176 is disposed or extends about the radial flow cavity 138. The internal partition wall 176 is disposed between and separates the first pressure side hybrid skin core cavity 130 from the second pressure side hybrid skin core cavity 132. The internal partition wall 176 is disposed between and separates the suction side hybrid skin core cavity 136 from the first serpentine flow cavity 140.

The impingement resupply openings 174 A,B can be formed by one or more structures that connect or extend between the leading edge hybrid skin core 160 and the radial core 182, as will be appreciated by those of skill in the art. That is, when forming an airfoil in accordance with an embodiment of the present disclosure, the leading edge hybrid skin core 160 and the radial core 182 can be configured with structures extending therebetween to form the impingement resupply openings 174 A,B that connect the forward radial flow cavity 138 and the leading edge hybrid skin core cavity 134 in the formed airfoil body 90.

The impingement resupply openings 174 A,B enable both high pressure and lower temperature cooling air from the forward radial flow cavity 138 to flow into the leading edge hybrid skin core cavity 134. The higher pressure and colder cooling air supplied by the forward radial flow cavity 138 may be required to mitigate increased internal cavity total pressure losses and cooling air temperature heat pickup attributed to the high thermal convective efficiency characteristics achievable within the leading edge hybrid skin core cavity 134. The impingement resupply openings 174 A,B may be implemented to enable more distributed fluid communication between the forward radial flow cavity 138 and the leading edge hybrid skin core cavity 134. Incorporating two or more dispersed arrays of impingement resupply openings 174 A,B will provide a more uniform circumferential and radial distribution of backside convective heat transfer and thermal cooling effectiveness along the internal wall surface of at least one of the leading edge hybrid skin core cavity 134 and the forward radial flow cavity 138. A generally uniform distribution of resupply air through the resupply openings 174 A,B mitigates circumferential and radial thermal metal temperature gradients, therefore reducing local temperature gradients circumferentially and radially along the leading edge 100 and thereby reducing the local thermal mechanical strain.

The impingement resupply openings 174 A,B may be incorporated in conjunction with film cooling holes 178. The film cooling holes 178 may extend at least partially through the third wall 124 proximate the leading edge 100. In some embodiments, a single film cooling hole may be provided proximate the leading edge 100. In some embodiments, centerlines of the film cooling holes 178 and the impingement resupply openings 174 A,B may be proximately aligned. In other embodiments, centerlines of the film cooling holes 178 and the impingement resupply openings 174 A,B may be circumferentially offset from each other such that their respective centerlines are not proximately aligned.

The internal partition wall 176 separates the forward radial flow cavity 138 from the first pressure side hybrid skin core cavity 130, the leading edge hybrid skin core cavity 134, and the suction side hybrid skin core cavity 136. The internal partition wall 176 radially extends between the root region 96 and the tip region 98. The internal partition wall 176 is circumferentially disposed about the forward radial flow cavity 138.

Although shown herein with film cooling holes and impingement holes located in certain or specific areas, such placement is not to be limiting. For example, in other embodiments various fluid connecting holes can be provided to fluidly connect one or more (e.g., any) of the cavities of the airfoil (hybrid, conventional, or feed). That is, for example, first pressure side hybrid skin core cavity 130, a second pressure side hybrid skin core cavity 132 can be fluidly connected by one or more cross-over holes or apertures. Similarly, cross-overs can be formed between different sections of the serpentine cavity (e.g., up-pass and down-pass can be fluidly connected through cross-over apertures). In another example, one or both of the first pressure side hybrid skin core cavity 130 and the suction side hybrid skin core cavity 136 may include fluid connection apertures to fluidly connect with the forward radial flow cavity 138. Further, in another example, the leading edge hybrid skin core cavity 134 can be fluidly connected to one or more (e.g., either or both) pressure/suction cavities (e.g., the suction side hybrid skin core cavity 136, first pressure side hybrid skin core cavity 130, second pressure side hybrid skin core cavity 132). Those of skill in the art will appreciate that the hybrid skin cores used to form the hybrid skin core cavities can be manufactured and/or assembled with structures appropriate to form the fluid connections between cavities.

Referring to FIGS. 7-10, 13-16, and 18, the forward radial flow cavity 138 is formed by a portion of a forward radial flow core 180. The forward radial flow core 180 may be used during a manufacturing process to form the forward radial flow cavity 138 within the airfoil body 90. In accordance with some embodiments, the manufacturing process is an investment casting process, although other manufacturing techniques, including advanced additive manufacturing processes, may be utilized to fabricate ceramic silica or alumina core bodies and/or directly additively manufacture airfoil geometries using nickel based powders to produce form blade airfoil internal cooling geometries and design configurations to form blades and airfoils in accordance with embodiments of the present disclosure.

The forward radial flow core 180, as shown, includes a radial core 182 joined to an axially extending, radially diffusing tip flag core 184. Although shown as a single core body, those of skill in the art will appreciate that in some embodiments the radial core 182 and the radially diffusing tip flag core 184 may be formed from separate bodies or structures. The radial core 182 extends radially from the root region 96 toward the tip region 98 and defines the forward radial flow cavity 138. The radial core 182 is spaced apart from the leading edge hybrid skin core 160.

The radially diffusing tip flag core 184 extends axially from the radial core 182 proximate the leading edge 100 toward the trailing edge 102. The radially diffusing tip flag core 184 is oriented generally perpendicular to the radial core 182. The radial core 182 forms the forward radial flow cavity 138 within the airfoil body 90 that extends from the root region 96 toward the tip region 98, but does not exit thereon. That is, the forward radial flow cavity 138 does not extend the full radial length of the airfoil body 90.

The radially diffusing tip flag core 184 defines a radially diffusing tip flag cavity 139 that is located within and immediately adjacent to the tip region 98 and extends over the serpentine flow cavities 140, 142, 144. The radially diffusing tip flag cavity 139 is spaced apart from the leading edge 100 and extends towards the trailing edge 102. The radially diffusing tip flag cavity 139 is in fluid communication with the forward radial flow cavity 138. The radially diffusing tip flag cavity 139 is at least partially defined between the rib 112, the first wall 120, the third wall 124, and at least one of the tip shelf 110, the tip surface 126, and the pocket surface 128.

Referring to FIGS. 7-10, 13-16, and 18, the rib 112 is defined between the radially diffusing tip flag cavity 139 and at least one of the first serpentine flow cavity 140, the second serpentine flow cavity 142, and the third serpentine flow cavity 144. The rib 112 is oriented at an angle relative to the tip shelf 110 of the airfoil 60 (i.e., not parallel). The rib 112 becomes progressively closer to at least one of the first serpentine flow cavity 140, the second serpentine flow cavity 142, and the third serpentine flow cavity 144 in a direction that extends from the leading edge 100 towards the trailing edge 102. In other words, the rib 112 becomes disposed progressively farther away from at least one of the tip shelf 110, the tip surface 126, and the pocket surface 128 in a direction that extends from the leading edge 100 towards the trailing edge 102.

The rib 112 defines a radial diffusion angle of the radial diffusing tip flag cavity 139. The extent of the radial diffusion angle of the rib 112 that at least partially defines the radially diffusing tip flag cavity 139 is determined by establishing the optimal distribution of internal convective heat transfer and cooling air heat pickup necessary to optimize the local thermal cooling effectiveness while minimizing the local metal temperature gradient and relative metal temperature distribution between the radially diffusing tip flag cavity 139 and the first, second, and third serpentine flow cavities 140, 142, and 144 respectively. The thermal management of pressure rise and cooling air temperature heat pickup to the inlet portion of the radial diffusing tip flag cavity 139 is primarily governed by a volumetric flow rate through the forward radial flow cavity 138, and subsequent pressure and temperature rise due to solid body pumping induced by the inertial forces generated by the rotation of the airfoil 60. The flow rate in the radially diffusing tip flag cavity 139 is a function of a pressure ratio at a junction between the forward radial flow cavity 138 and the tip flag cavity 139 and an exit of the tip flag cavity 139.

The radial diffusing tip flag core 184 and/or the radially diffusing tip flag cavity 139 has a radial height H that is measured between the rib 112 and at least one of the tip surface 126, the tip shelf 110, or the pocket surface 128 of the tip squealer pocket 114. The radial height H increases in a direction that extends from the leading edge 100 toward the trailing edge 102. In some embodiments, the radial height H of the radial diffusing tip flag core 184 and/or the radial diffusing tip flag cavity 139 at the trailing edge 102 is greater than the radial height H of the radial diffusing tip flag core 184 and/or the radial diffusing tip flag cavity 139 at the junction between the radial core 182 (the forward radial flow cavity 138) and the radial diffusing tip flag core 184 (the radial diffusing tip flag cavity 139). That is, the radial height H of the radial diffusing tip flag core 184 (the radial diffusing tip flag cavity 139) at an end away from a junction with the radial core 182 (the forward radial flow cavity 138) is greater than the radial height H of the radial diffusing tip flag core 184 (the radial diffusing tip flag cavity 139) at the junction.

The increasing radial height H of the radial diffusing tip flag cavity 139 arranges the radial diffusing tip flag cavity 139 as a radially diffused tip flag cavity having a constant, gradually increasing, and/or gradually decreasing flow area as the radial diffusing tip flag cavity 139 extends from the forward radial flow cavity 138 toward the trailing edge 102. A rate of flow area convergence within the radial diffusing tip flag cavity 139 is defined by the angle of the rib 112 and by a taper in the aerodynamic shape of the airfoil body 90 as the airfoil body 90 narrows toward the trailing edge 102 (e.g., as shown in FIGS. 5-6). That is, a narrowing of the airfoil body 90 is achieved by a reduction in a relative distance between the pressure side 92 (the first wall 120) and the suction side 94 (the third wall 124) as the two sides (walls) each progress toward the trailing edge 102. The flow area distribution of the radially diffusing tip flag cavity 139 is dictated by the desired internal pressure loss, heat transfer, and cooling heat pickup necessary to optimally tailor the convective and film cooling adjacent to the pressure side 92 and suction side 94 surfaces as a function of the external heat flux distribution and metal temperature requirements to achieve durability life goals.

The radial diffusing tip flag cavity 139 may be provided with internal convective heat transfer features such as, for example, trip strips, turbulators, pedestals, and/or pin fins to tailor local thermal cooling effectiveness in order to mitigate local heat load distributions along the local tip airfoil pressure side 92, the suction side 94, and the tip region 98.

The radial diffusion of the radial diffusing tip flag cavity 139 facilitates a more efficient utilization of the cooling air that is received within the forward radial flow cavity 138. Additionally, the shielding of the forward radial flow cavity 138 by the other cavities (e.g., as described above) provides locally colder cooling air that enables a relatively high cooling potential due to the greater temperature difference that exists between a hot external mainstream flow and the colder internal air within the radial diffusing tip flag cavity 139. The increased temperature differential, as well as the higher internal convective cooling heat transfer enables a greater reduction in local material temperatures proximate the tip region 98 and/or proximate the radial diffusing tip flag cavity 139 with lower cooling mass flow rates which in turn may improve efficiency of the turbine section 28. Furthermore, the radial diffusion of the radial diffusing tip flag cavity 139 more efficiently cools the pressure side 92 and the suction side 94 of the airfoil 60 proximate the tip region 98 that is relatively close to the trailing edge 102.

As shown in FIGS. 16 and 18, an alternative configuration of a core structure in accordance with an embodiment of the present disclosure is shown. In this embodiment, the rib 112 that will be defined between the tip flag core 184 and portions of the serpentine core 200 (e.g. the first upward pass core 206, the first downward pass core 208, the second upward pass core 210) may be curvilinear, may be provided with multiple inflections, and/or diffusion angles. The rib 112 may be generally horizontal or upwardly extending.

Referring back to FIGS. 7-10, 13-16, and 18, the radial diffusing tip flag core 184 may define trailing edge slots 196. Cooling air that flows through the forward radial flow cavity 138 is bled through the radial diffusing tip flag cavity 139 and subsequently the trailing edge slots 196.

Referring to FIG. 6, the first serpentine flow cavity 140, the second serpentine flow cavity 142, and the third serpentine flow cavity 144 may be fluidly connected to each other. The first serpentine flow cavity 140, the second serpentine flow cavity 142, and the third serpentine flow cavity 144 extend between the root region 96 and the tip region 98. The radial diffusing tip flag cavity 139 is located between the tip shelf 110 and/or the tip squealer pocket 114 and the first serpentine flow cavity 140, the second serpentine flow cavity 142, and the third serpentine flow cavity 144, and fluidly separated therefrom. However, those of skill in the art will appreciate that one or more of the serpentine cavities 140, 142, 144 may be fluidly connected to the radial diffusing tip flag cavity 139 by one or more bleed ports or other structures. As shown in FIGS. 8, 9, 13, 14, and 16, the forward radial flow cavity 138 is at least partially radially and axially disposed about the first serpentine flow cavity 140, the second serpentine flow cavity 142, and the third serpentine flow cavity 144.

The first serpentine flow cavity 140, the second serpentine flow cavity 142, and the third serpentine flow cavity 144 are each located between the pressure side 92 and the suction side 94 and generally within the central portion of the airfoil body 90. The first serpentine flow cavity 140, the second serpentine flow cavity 142, and the third serpentine flow cavity 144 are each axially disposed between the forward radial flow cavity 138 and the trailing edge slot 146.

The first serpentine flow cavity 140, the second serpentine flow cavity 142, and the third serpentine flow cavity 144 are each fluidly connected to a serpentine inlet cavity. In some embodiments, the serpentine inlet cavity is configured as a dual serpentine inlet cavity. The first serpentine flow cavity 140, the second serpentine flow cavity 142, and the third serpentine flow cavity 144 receive cooling air from the serpentine inlet cavity to cool the airfoil body 90. The cooling air flows through the first serpentine flow cavity 140, the second serpentine flow cavity 142, and the third serpentine flow cavity 144 and the cooling air is discharged from the third serpentine flow cavity 144 through the trailing edge slot 146 that is disposed adjacent to and is fluidly connected to the third serpentine flow cavity 144.

The total serpentine stream wise length of the first serpentine flow cavity 140, the second serpentine flow cavity 142, and the third serpentine flow cavity 144 are reduced due to the radially diffused tip flag cavity 139. As shown in FIG. 7, for example, the radial length of each serpentine flow cavity may lessen from the leading edge to the trailing edge.

Referring to FIGS. 7-9, 13, 14, 16, and 18, the first serpentine flow cavity 140, the second serpentine flow cavity 142, and the third serpentine flow cavity 144 are formed by a serpentine core 200. The serpentine core 200 may be used during a manufacturing process to form the first serpentine flow cavity 140, the second serpentine flow cavity 142, and the third serpentine flow cavity 144 within an airfoil body 90. In accordance with some embodiments, the manufacturing process is a casting process, although other advanced additive manufacturing processes, may be utilized to fabricate ceramic silica or alumina core bodies and/or directly additively manufacture airfoil geometries using nickel based powders to produce form blade airfoil internal cooling geometries and design configurations, may be employed to form blades and airfoils in accordance with embodiments of the present disclosure.

The serpentine core 200 includes a first serpentine trunk 202, a second serpentine trunk 204, a first upward pass core 206, a first downward pass core 208, and a second upward pass core 210. The first serpentine trunk 202 extends radially toward the first upward pass core 206 and the second upward pass core 210. The second serpentine trunk 204 is spaced apart from and is disposed parallel to the first serpentine trunk 202. The second serpentine trunk 204 extends toward the first upward pass core 206. The first serpentine trunk 202 and the second serpentine trunk 204 define the serpentine inlet cavity.

The first upward pass core 206 extends radially from at least one of the first serpentine trunk 202 and the second serpentine trunk 204. The first upward pass core 206 extends radially and axially towards the forward radial flow core 180. The first upward pass core 206 has a profile that is complementary to the profile of the radial core 182.

The first downward pass core 208 extends axially and radially from the first upward pass core 206. The first downward pass core 208 extends radially towards the first serpentine trunk 202 and the second serpentine trunk 204. The first downward pass core 208 is disposed between the first upward pass core 206 and the second upward pass core 210.

The second upward pass core 210 extends radially and axially from the first downward pass core 208 towards the trailing edge slot 146. The trailing edge slot 146 extends radially and axially from the second upward pass core 210.

The pressure side hybrid skin core 150, the leading edge hybrid skin core 160, the suction side hybrid skin core 170, the forward radial flow core 180, and the serpentine core 200 define an airfoil core assembly. The airfoil core assembly is used to form cavities within an airfoil 60 during a manufacturing process for forming the airfoil.

As used herein, the term "about" is intended to include the degree of error associated with measurement of the particular quantity based upon the equipment available at the time of filing the application. For example, "about" may include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A core assembly for manufacturing an airfoil of a gas turbine engine, the core assembly comprising:
   a leading edge hybrid skin core positioned relative to a plurality of core bodies and configured to define a leading edge cavity at a leading edge of the manufactured airfoil;
   wherein the leading edge hybrid skin core extends from a root region toward a tip region in a radial direction,
   wherein the leading edge hybrid skin core extends above at least one of the plurality of core bodies to define an exit in a tip region of the manufactured airfoil, and
   wherein the leading edge hybrid skin core has a height-to-width ratio of about 0.8 or less,
   wherein the plurality of core bodies comprise:
   a pressure side hybrid skin core having a first trunk and a first branch that extends from the first trunk;
   a suction side hybrid skin core spaced apart from the pressure side hybrid skin core;

wherein the leading edge hybrid skin core is circumferentially located between the pressure side hybrid skin core and the suction side hybrid skin core; and a radial flow core located between the pressure side hybrid skin core, the suction side hybrid skin core, and the leading edge.

2. The core assembly of claim 1, wherein the leading edge hybrid skin core has an arcuate geometry defined to match a contour of a leading edge of the manufactured airfoil.

3. The core assembly of claim 1, wherein the plurality of core bodies includes a radial flow core located axially behind the leading edge hybrid skin core.

4. The core assembly of claim 3, further comprising one or more structures extending between the radial flow core and the leading edge hybrid skin core to form resupply openings fluidly connecting cavities formed by the leading edge hybrid skin core and the radial flow core in the manufactured airfoil.

5. The core assembly of claim 1, further comprising one or more structures extending between the leading edge hybrid skin core and at least one of the plurality of core bodies to form a fluid connection between cavities formed within in the manufactured airfoil.

6. The core assembly of claim 1, wherein the leading edge hybrid skin core includes structures to form internal convective heat transfer augmentation features within a cavity formed thereby.

7. The core assembly of claim 6, wherein the internal convective heat transfer augmentation features include at least one of trip strips, turbulators, pin fins, or pedestals.

8. The core assembly of claim 1, wherein the radial flow core includes a radial core that is disposed parallel to at least one of the pressure side hybrid skin core, the suction side hybrid skin core, and the leading edge hybrid skin core.

9. The core assembly of claim 1, wherein the radial flow core includes a radial diffusing tip flag core that extends from the radial core in a direction away from the leading edge hybrid skin core.

* * * * *